US012667914B2

(12) United States Patent
Walker et al.

(10) Patent No.: US 12,667,914 B2
(45) Date of Patent: Jun. 30, 2026

(54) HIGH VELOCITY VACUUM SYSTEM FOR LASER ABLATION

(71) Applicant: BOLD LASER AUTOMATION, INC., Bedford, NH (US)

(72) Inventors: Kyler Babcock Walker, Newry, ME (US); Todd Ethan Lizotte, Hooksett, NH (US); Joe William Dagher, Manchester, NH (US); Patricia Buckley, Pittsfield, NH (US); Orest Petro Ohar, Litchfield, NH (US)

(73) Assignee: BOLD LASER AUTOMATION, INC., Bedford, NH (US)

( * ) Notice: Subject to any disclaimer, the term of this patent is extended or adjusted under 35 U.S.C. 154(b) by 797 days.

(21) Appl. No.: 17/999,518

(22) PCT Filed: May 21, 2021

(86) PCT No.: PCT/US2021/033661
§ 371 (c)(1),
(2) Date: Nov. 21, 2022

(87) PCT Pub. No.: WO2021/237095
PCT Pub. Date: Nov. 25, 2021

(65) Prior Publication Data
US 2023/0286080 A1 Sep. 14, 2023

Related U.S. Application Data

(60) Provisional application No. 63/028,855, filed on May 22, 2020.

(51) Int. Cl.
*B23K 26/16* (2006.01)
*B23K 26/064* (2014.01)
*B23K 26/38* (2014.01)

(52) U.S. Cl.
CPC ............ *B23K 26/16* (2013.01); *B23K 26/064* (2015.10); *B23K 26/38* (2013.01)

(58) Field of Classification Search
CPC ....... B23K 26/38; B23K 26/064; B23K 26/16
(Continued)

(56) References Cited

U.S. PATENT DOCUMENTS 3,991,296 A * 11/1976 Kojima ................ B23K 26/146
219/121.68
4,149,062 A * 4/1979 Limmer .................. B08B 15/04
219/121.84

(Continued)

OTHER PUBLICATIONS

International Search Report Corresponding to PCT/US2021/033661 mailed Sep. 10, 2021.
(Continued)

*Primary Examiner* — Jimmy Chou
(74) *Attorney, Agent, or Firm* — Secant IP, P.L.L.C.

(57) ABSTRACT
A laser processing system comprising a laser beam generation source, at least one table, an Optical Laser Engine assembly for redirecting the laser pulses toward the desired surface to be processed, a plurality of high velocity plume/debris extraction segments for removing a plume/debris, a rotatable turret assembly having a plurality of inlet ports connected with the plurality of high velocity plume/debris extraction segments, and a dust collector separator and a blower coupled to the rotatable turret assembly for generating negative pressure. Each of the plurality of high velocity plume/debris extraction segments is connected to one of the plurality of inlet ports. The rotatable turret assembly has a turret which is rotatable, by a motor, to selectively subject a desired one or pair of the plurality of high velocity plume/debris extraction segments to negative pressure, during processing, for removing the plume/debris during treatment of the desired surface to be processed.

19 Claims, 19 Drawing Sheets

(58) Field of Classification Search
USPC .................................................... 219/121.73
See application file for complete search history.

(56) References Cited

U.S. PATENT DOCUMENTS

| | | | | |
|---|---|---|---|---|
| 4,201,905 A * | 5/1980 | Clark | ................. | B23K 26/1476 |
| | | | | 219/68 |
| 4,303,824 A * | 12/1981 | Morgan | ............. | B23K 26/1438 |
| | | | | 219/121.84 |
| 4,315,133 A * | 2/1982 | Morgan | ............. | B23K 26/1438 |
| | | | | 219/121.84 |
| 4,324,972 A * | 4/1982 | Furrer | .................. | B23K 26/046 |
| | | | | 219/121.75 |
| 4,347,785 A * | 9/1982 | Chase | .................. | B23K 26/142 |
| | | | | 219/121.84 |
| 5,359,176 A * | 10/1994 | Balliet, Jr. | ......... | B23K 26/1476 |
| | | | | 219/121.84 |
| 5,662,762 A * | 9/1997 | Ranalli | .............. | B29C 63/0013 |
| | | | | 156/707 |
| 6,144,010 A * | 11/2000 | Tsunemi | ............. | B23K 26/034 |
| | | | | 219/121.84 |
| 6,531,682 B1 * | 3/2003 | Guttler | ................. | B23K 26/147 |
| | | | | 219/121.84 |
| 6,683,277 B1 * | 1/2004 | Millard | ............. | B23K 26/1436 |
| | | | | 219/121.84 |
| 6,969,822 B2 * | 11/2005 | Pollard | ................ | B23K 26/127 |
| | | | | 219/121.84 |
| 7,605,345 B2 * | 10/2009 | Fukuda | ................ | B23K 26/702 |
| | | | | 219/121.84 |
| 8,013,270 B2 * | 9/2011 | Shimoda | ............... | C23C 16/483 |
| | | | | 219/121.6 |
| 8,283,596 B2 * | 10/2012 | Murase | ............. | B23K 26/0732 |
| | | | | 219/121.72 |
| 8,704,129 B2 * | 4/2014 | Sykes | .................. | B23K 26/142 |
| | | | | 219/121.75 |
| 11,759,888 B2 * | 9/2023 | Cherubini | .......... | B23K 26/0876 |
| | | | | 219/121.72 |
| 2002/0074318 A1 * | 6/2002 | Vogt | ........................ | H10F 71/00 |
| | | | | 219/121.78 |
| 2002/0121504 A1 * | 9/2002 | Miura | ................... | H01J 37/301 |
| | | | | 219/121.22 |
| 2002/0179582 A1 * | 12/2002 | Reichmann | ........ | B23K 26/1476 |
| | | | | 219/121.84 |
| 2003/0080096 A1 * | 5/2003 | Yamaguchi | ........ | B23K 37/0461 |
| | | | | 219/121.44 |
| 2003/0217809 A1 * | 11/2003 | Morishige | .............. | B23K 26/03 |
| | | | | 118/724 |
| 2004/0226926 A1 * | 11/2004 | Pollard | ................ | B23K 26/125 |
| | | | | 219/121.84 |
| 2004/0226927 A1 * | 11/2004 | Morikazu | ........... | B23K 26/142 |
| | | | | 219/121.84 |
| 2007/0051710 A1 * | 3/2007 | Odanaka | ................. | B08B 15/04 |
| | | | | 219/121.84 |
| 2007/0145026 A1 * | 6/2007 | Murase | ............. | B23K 26/1462 |
| | | | | 219/121.84 |
| 2007/0151958 A1 * | 7/2007 | Modra | ................... | B23K 26/38 |
| | | | | 219/121.67 |
| 2007/0210045 A1 * | 9/2007 | Aso | ....................... | B23K 26/123 |
| | | | | 219/121.71 |
| 2007/0243696 A1 * | 10/2007 | Kobayashi | ......... | B23K 26/0604 |
| | | | | 257/E21.002 |
| 2008/0041832 A1 * | 2/2008 | Sykes | .................... | B23K 26/12 |
| | | | | 219/121.84 |
| 2008/0149605 A1 * | 6/2008 | Sykes | ................ | B23K 26/1462 |
| | | | | 219/121.82 |
| 2008/0210675 A1 * | 9/2008 | Sasaki | .................. | B23K 26/142 |
| | | | | 219/121.84 |
| 2009/0107966 A1 * | 4/2009 | Wojcik | ............... | B23K 26/0622 |
| | | | | 219/121.72 |
| 2009/0127237 A1 * | 5/2009 | Ozeki | .................... | B23K 26/16 |
| | | | | 219/121.67 |
| 2009/0224432 A1 * | 9/2009 | Nagatomo | .......... | B28D 5/0011 |
| | | | | 264/400 |
| 2010/0102044 A1 * | 4/2010 | Takizawa | ............... | B23K 26/14 |
| | | | | 219/121.72 |
| 2010/0252541 A1 * | 10/2010 | Hogan | ................. | B23K 26/142 |
| | | | | 219/121.67 |
| 2011/0095005 A1 * | 4/2011 | Brunner | ................. | B23K 26/36 |
| | | | | 219/121.68 |
| 2011/0220625 A1 * | 9/2011 | Pluss | .................. | B23K 26/0823 |
| | | | | 219/121.72 |
| 2014/0026351 A1 * | 1/2014 | Willey | .................. | A47L 9/2842 |
| | | | | 15/300.1 |
| 2014/0048519 A1 * | 2/2014 | Gadd | ..................... | B23K 26/16 |
| | | | | 219/121.84 |
| 2014/0097162 A1 * | 4/2014 | Jeong | .................. | B23K 26/362 |
| | | | | 219/121.75 |
| 2014/0154871 A1 * | 6/2014 | Hwang | ................. | B23K 26/36 |
| | | | | 219/121.67 |
| 2014/0263221 A1 * | 9/2014 | Minehara | .................. | G21F 9/28 |
| | | | | 219/121.73 |
| 2014/0305917 A1 * | 10/2014 | Gadd | .................... | B23K 26/36 |
| | | | | 219/121.72 |
| 2014/0305918 A1 * | 10/2014 | Endo | .................... | B23K 26/142 |
| | | | | 219/121.84 |
| 2015/0048068 A1 * | 2/2015 | Matsushita | ............ | H01L 24/36 |
| | | | | 219/121.64 |
| 2016/0001401 A1 * | 1/2016 | Dimter | ................... | B22F 10/28 |
| | | | | 219/76.12 |
| 2016/0129527 A1 * | 5/2016 | Moon | .................... | B23K 26/38 |
| | | | | 425/174.4 |
| 2018/0333806 A1 * | 11/2018 | Cherubini | .......... | B23K 26/0876 |
| 2019/0176282 A1 * | 6/2019 | Speker | .................. | B23K 26/70 |
| 2020/0306936 A1 * | 10/2020 | Blaser | ............... | B23K 37/0461 |

OTHER PUBLICATIONS

Written Opinion Corresponding to PCT/US2021/033661 mailed Sep. 10, 2021.

* cited by examiner

HIGH VELOCITY VACUUM SYSTEM FOR LASER ABLATION

FIELD OF THE INVENTION

The present invention relates to a high velocity vacuum system, for use during a laser ablation manufacturing process, that is located adjacent the area being processed and designed to removed any generated debris and/or potentially harmful gases created during the ablation process. The high velocity vacuum system typically comprises a plurality of high velocity vacuum segments which are arranged around substantially the entire perimeter of the area being processed to facilitate maintaining the area being processed by the laser substantially free of all of the generated debris and/or gases. The various segments of the high velocity vacuum system are selectably switchable, on and off, in order to focus vacuuming of the exhaust stream from the area currently being processed.

The disclosure also relates to formation of an optimized Optical Laser Engine (OLE) and beam delivery configuration for highly energetic ablative laser processes and lower power/energy fine laser processes where the synchronization of and the utilization of high speed scanning, scanning at a rate of from 4 meters per second to 24 meters/second, the use of cover gas air knife protection and the synchronization of debris and gas removal, and synchronized laser motion so as to improve the quality of the process as well as the maintain the safety of the laser system operator.

BACKGROUND OF THE INVENTION

Removing material from a substrate to form a desired structure(s) is generally referred to as micromachining, milling, or etching. Lasers beams and charged particle beams are two particular technologies used for micromachining. Each has advantages and limitations in various applications.

Laser systems use several different mechanisms for micromachining. In some processes, the laser is used to supply heat to a substrate to induce a chemical reaction. The reaction occurs only in the heated areas. The heat tends to diffuse to an area larger than the laser beam spot, making the resolution of the process poorer than the laser spot size and causing concomitant thermal damage to nearby structures. Another mechanism used in laser micromachining is photochemical etching, in which the laser energy is absorbed by individual atoms or molecules (particles) of the substrate, exciting them into a state in which they can chemically react with an etchant. Photochemical etching is limited to materials that are photochemically active. Another mechanism used in laser machining is laser ablation, in which energy supplied rapidly to a small volume causes atoms to be explosively expelled from the substrate.

Charged particle beams include ion beams and electron beams. Ions in a focused beam typically have sufficient momentum to micromachine by physically ejecting material from a surface. Because electrons are much lighter than ions, electron beams are typically limited to removing material by inducing a chemical reaction between an etchant vapor and the substrate. Ions beams typically are generated from a liquid metal ion source or by a plasma ion source. The spot size of a charged particle beam depends on many factors, including the type of particles and the current in the beam. A beam with low current can typically be focused to a smaller spot and, therefore, produce a smaller structure than a beam with high current, but a low current beam takes longer to micromachine a structure than a high current beam.

Lasers are typically capable of supplying energy to a substrate at a much higher rate than charged particle beams, and so lasers typically have much higher material removal rates than charged particle beams. When a high power pulsed laser producing beam is focused onto a target material and the laser fluence exceeds the ablation threshold of the material, chemical bonds in the target material are broken and the material is fractured into energetic fragments, typically a mixture of neutral atoms, ions, clusters, and nano- and micro-particles creating a plasma plume above the material surface. Since the material leaves the reaction zone as an energetic plasma, gas, and solid debris mixture, the ablation process resembles explosive evaporation of the material which propels material fragments up and away from the point where the laser is focused. As the plasma cools, some of the solid debris may be redeposited on the workpiece surface, thus reducing the quality of the cut and decreasing the cutting efficiency since the debris must be removed again before the beam interacts with the workpiece surface.

Various techniques are known to minimize undesirable redeposition during laser ablation, but such currently known techniques are inadequate.

SUMMARY OF THE INVENTION

Wherefore, it is an object of the present invention to overcome the above mentioned shortcomings and drawbacks associated with the prior art systems for dealing with laser ablation problems and issues that arise.

Another object of the present invention is to provide a high velocity vacuum system which comprises a plurality of individual segments which can be readily and easily assembled with one another to surround substantially the entire perimeter of the area being processed and facilitate removal of any generated smoke, debris and/or potentially harmful gases as well as preventing re-solidification of the remove debris back onto the surface being processed.

A further object of the present invention is to designed a high velocity vacuum system which generates substantially laminar flow of an exhaust stream which has a velocity of between 100 and 1500 cubic feet per minute, and more preferably a velocity between 200 and 800 cubic feet per minute, so that such high velocity exhaust stream assists with removing any generated smoke, debris and/or potentially harmful gases as well as preventing re-solidification of such removed debris back onto the surface being processed.

Yet another object of the present invention is to provide a high velocity vacuum system which comprises a plurality of separate vacuum segments which can be arranged side-by-side adjacent one another so as to form a high velocity vacuum system which completely surrounds the entire perimeter of the area being processed by the laser.

A further object of the present invention is to connected all of the high velocity vacuum segments to a single vacuum source and to provide the high velocity vacuum system with a switching arrangement which allows selectively one or more of the vacuum segments to experience the negative pressure, generated by the single vacuum source, while the remaining vacuum segments are prevented from being subjected or experiencing any negative pressure generated by the single vacuum source, so that the negative pressure can be focused on the area currently being processed by the laser.

Still another object of the disclosure is to provide each one of the high velocity vacuum segments with a very low surface profile which assists with mounting or securing each one of the high velocity vacuum segments to a table framework, closely adjacent the work surface, so that the nozzles of each one of the high velocity vacuum segments all lie in a common plane which is generally parallel to, but spaced slightly above, a plane defined by the surface being processed.

Another object of the disclosure is to design each one of the high velocity vacuum segments so that each high velocity vacuum segment generates substantially laminar flow into and through the nozzles of the high velocity vacuum segments so as to avoid creating any restriction or bottleneck for the exhaust stream flowing into and through the nozzle and thereby assist with creating a maximum velocity, reducing turbulence, and entrainingrticles within the exhaust stream during removal of material, trimming, cutting, drilling and selective material removal by the laser pulses.

According to a still further object of the disclosure, the motor-controlled scanning system incorporates a water-cooling loop to handle $CO_2$ laser power in excess of 200 Watts to upwards of 2000 Watts as well as dry air or nitrogen purge in a semi-sealed housing.

A still further object of the disclosure is to provide, adjacent the output of this motor-controlled scanning system, a pressure air knife set at an optimized location of one fifth of the working distance of the pre scanner-objective focusing element from the output aperture of the motor-controlled scanning system. This is important since the turbulence of the air knife cannot interfere with the laser beam or entrain debris and gas generated by the laser process below. Preferably, the air knife is located at an angled of between 4 and 30 degrees sloping downward toward the surface to be processed, with an optimize angle of 12 degrees being best for highly energetic $CO_2$ laser processes, i.e., those in excess of 500 Watts, whereas an air knife angle of 8 degrees is typically sufficient for lower power laser processes.

According to yet another object of the disclosure, the Optical Laser Engine includes a laser triangulation system or device which determines an optimum focus position and maintains this optimum focus position as the material being processed on the surface below is moved and its flatness or its topography changes and/or shifts so as to require a change in focus. The laser triangulation device sends an analog signal to the pre scanner objective to correct for the change and/or shift as well as to the Z-axis controller which adjust the position of the Optical Laser Engine relative to the surface being processed.

Still another object of the disclosure is to provide a laser system controller which, as the laser scans at high speed, synchronizes the laser scanner, a laser focus, a laser pulse rate and/or a modulation rate so as to deposit equally power or pulses onto the surface being treated, in harmony with the segments debris and gas extraction nozzle system, entraining and trapping the debris and gasses generated by the plume formed during the laser process. This synchronization is based on interpolated motion control, where all the axes of motion are synchronized with the laser modulation or the pulse sequence in conjunction with the integrated nozzle vacuum debris, gas and vapor extraction system. It is to be appreciated that this is crucial, since the highly energetic processes are typically less than 2 seconds in duration and the plume and debris forms a large formation that must be anticipated and mitigated in synchronized timing with the laser and motion.

The present invention also relates to a laser processing system comprising: a laser beam generation source for generating laser pulses; at least one table for supporting a desired surface to be processed; an Optical Laser Engine assembly for receiving and redirecting the generated laser pulses, from the laser beam generation source, toward the desired surface to be processed on the at least one table; a plurality of high velocity plume/debris extraction segments being supported by a table framework adjacent the desired surface to be processed for removing a plume and generated debris during treatment of the desired surface to be processed; a rotatable turret assembly having a plurality of inlet ports, and each one of the plurality of inlet ports is respectively connected with at least one of the plurality of high velocity plume/debris extraction segments by a respective segment hose; a dust collector separator and a blower being coupled to the rotatable turret assembly for generating the desired negative pressure and subjecting the rotatable turret assembly to the negative pressure; each of the plurality of high velocity plume/debris extraction segments being connected to one of the plurality of inlet ports of the rotatable turret assembly; and the rotatable turret assembly having a turret which is rotatable, by a motor, to selectively subject a desired one or desired pair of the plurality of high velocity plume/debris extraction segments to negative pressure, during processing by the generated laser pulses, for removing the plume and generated debris during treatment of the desired surface to be processed.

The present invention also relates to a method of ablating a desired surface with a laser processing system, the method comprising: providing a laser beam generation source for generating laser pulses; supporting the desired surface to be processed on at least one table; providing an Optical Laser Engine assembly for receiving and redirecting the generated laser pulses, from the laser beam generation source, toward the desired surface to be processed on the at least one table; supporting a plurality of high velocity plume/debris extraction segments, via a table framework, adjacent the desired surface to be processed for removing a plume and generated debris during treatment of the desired surface to be processed; providing a rotatable turret assembly having a plurality of inlet ports, and respectively connecting each one of the plurality of inlet ports with at least one of the plurality of high velocity plume/debris extraction segments by a respective segment hose; coupling a dust collector separator and a blower to the rotatable turret assembly for generating the desired negative pressure and subjecting the rotatable turret assembly to the negative pressure; connecting each of the plurality of high velocity plume/debris extraction segments to one of the plurality of inlet ports of the rotatable turret assembly; and rotating a turret of the rotatable turret assembly, by a motor, to selectively subject a desired one or desired pair of the plurality of high velocity plume/debris extraction segments to negative pressure, during processing by the generated laser pulses, to remove the plume and generated debris during treatment of the desired surface to be processed.

BRIEF DESCRIPTION OF THE DRAWINGS

The accompanying drawings, which are incorporated in and constitute a part of the specification, illustrate various embodiments of the disclosure and together with the general description of the disclosure given above and the detailed description of the drawings given below, serve to explain the principles of the disclosure. The invention will now be described, by way of example, with reference to the accompanying drawings in which.

Figure 1:
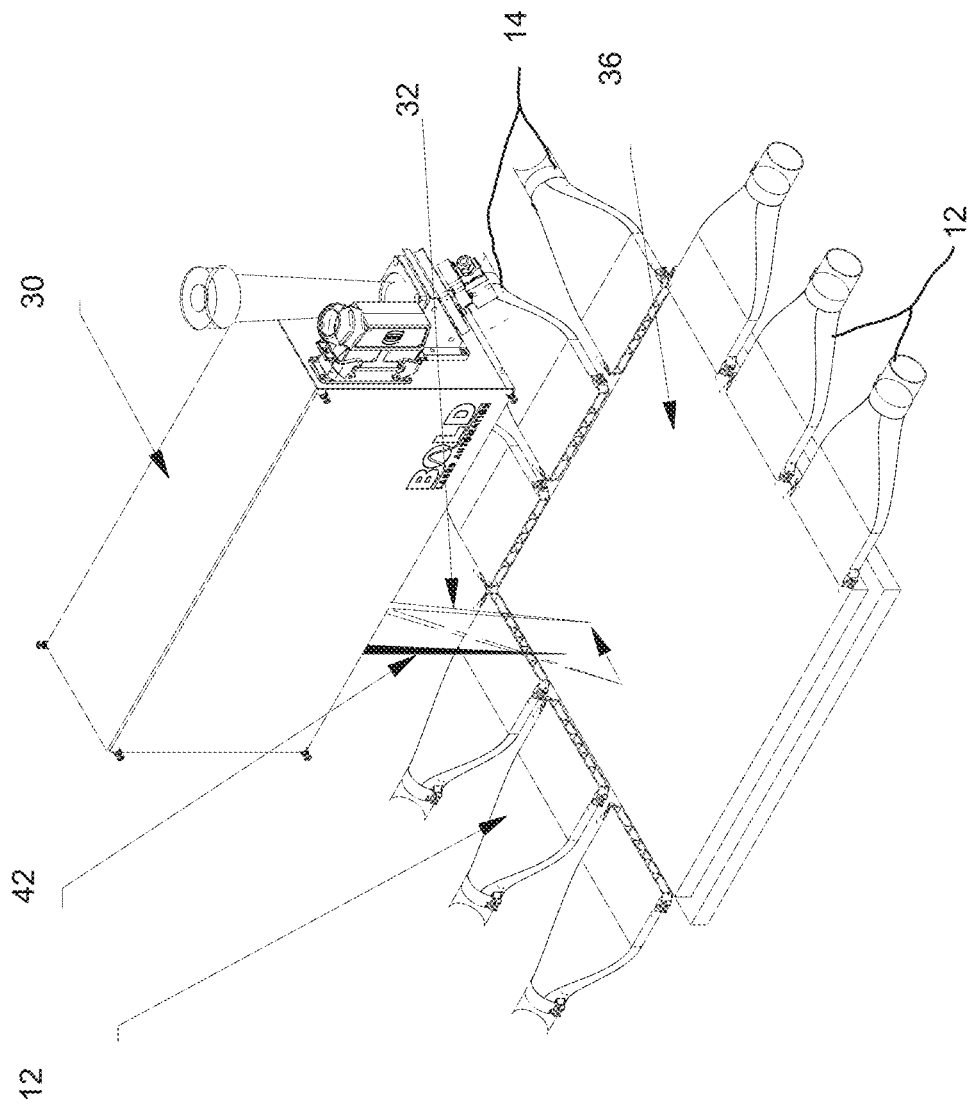
FIG. 1 is a perspective view of the Optical Laser Engine system which generally comprises a three to four axes high speed motor-controlled scanning system, which incorporates an X-Y scanner, a third axes pre scanner-objective focusing element and a fourth optical element for providing focus correction for angular scan angles generated by the X-Y scanner.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Turning now to FIGS. 1-5, a brief description concerning the various components of the laser processing system 2 will first be briefly discussed. Thereafter, this brief discussion will then be followed by a more detail discussion concerning each one of the various components of the laser processing system 2.

As shown, the laser processing system 2 generally comprise a conventional laser beam generation source 4, an Optical Laser Engine assembly 6, a table framework 8, supporting a pair of movable tables 10, which cooperates with the Optical Laser Engine assembly 6, a plurality of high velocity plume/debris extraction segments 12, 14 which are supported by the table framework 8 for removing smoke, plume and debris PD, a rotatable turret assembly 16 which has a plurality of inlet ports 18 that are each respectively connected with one or a pair of the plurality of high velocity plume/debris extraction segments 12, 14 by a respective segment hose 20, a dust collector separator 22 and a blower 24. The rotatable turret assembly 16, the dust collector separator 22 and the blower 24 together form a common vacuum source 26 (see FIG. 4) for generating the desired negative pressure for at least one and more preferably a pair of the high velocity plume/debris extraction segments 12, 14. The following description will describe, in further detail, the various components of the laser processing system 2 as well as their associated function.

Figure 2:
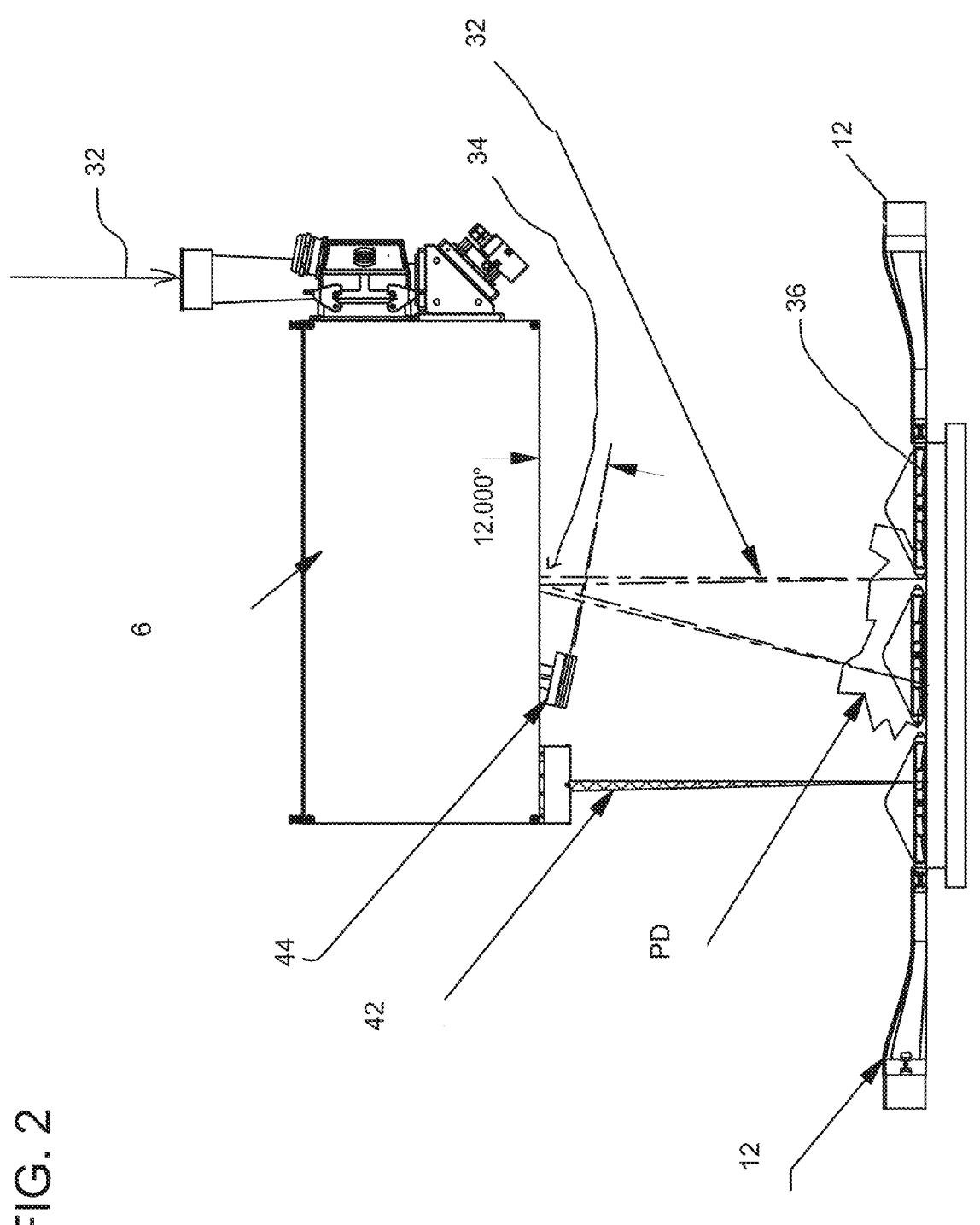
FIG. 2 is a diagrammatic front elevational view of the Optical Laser Engine assembly of FIG. 1.
Figures 3A, 3B, 3C, 3D:
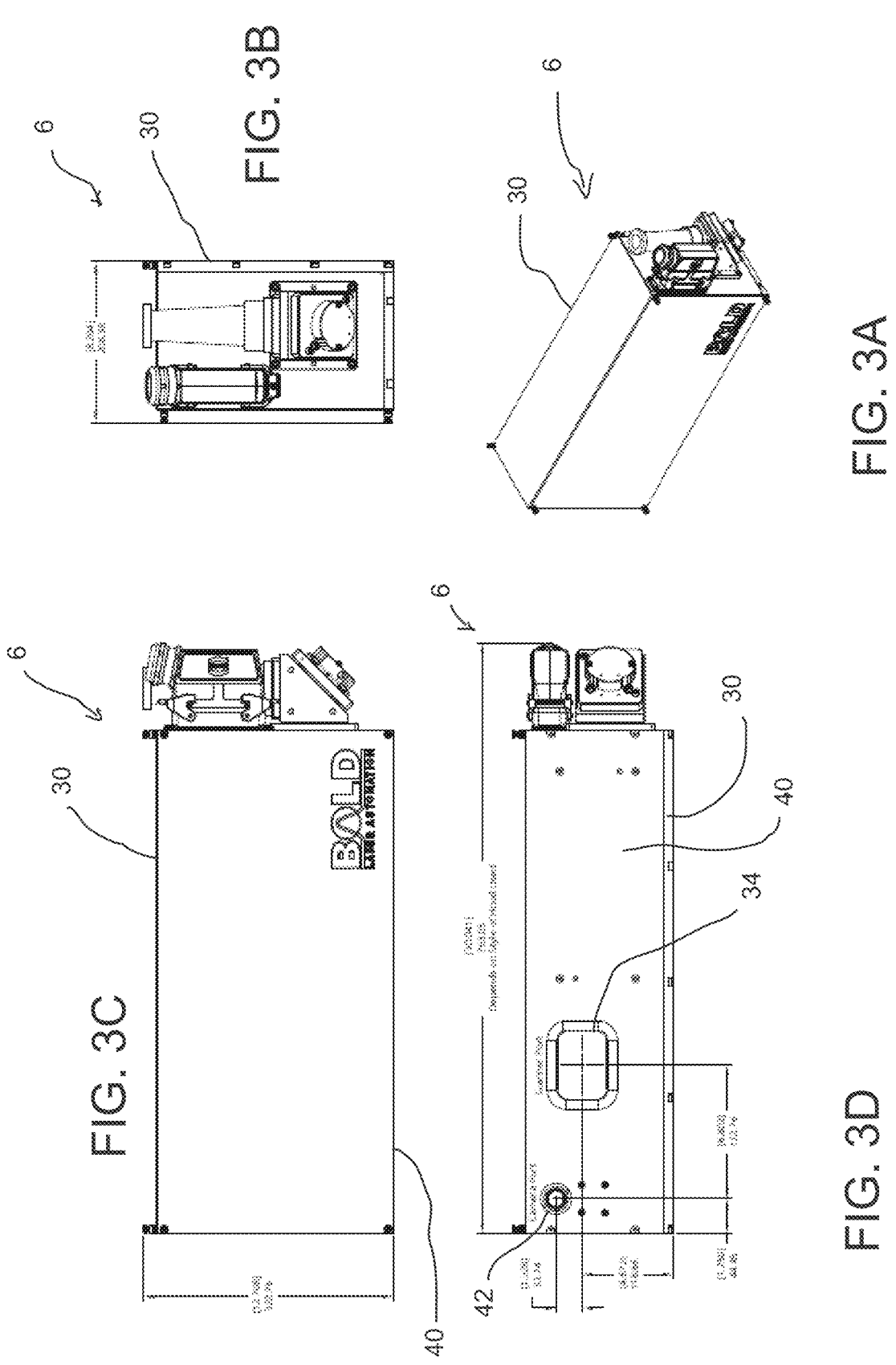
FIG. 3A is a diagrammatic perspective view of a housing incorporating the Optical Laser Engine system of FIG. 1.
FIG. 3B is a diagrammatic right side elevational view of FIG. 3A.
FIG. 3C is a diagrammatic front elevational view of FIG. 3A.
FIG. 3D is a diagrammatic bottom plan view of FIG. 3A.
Figure 4:
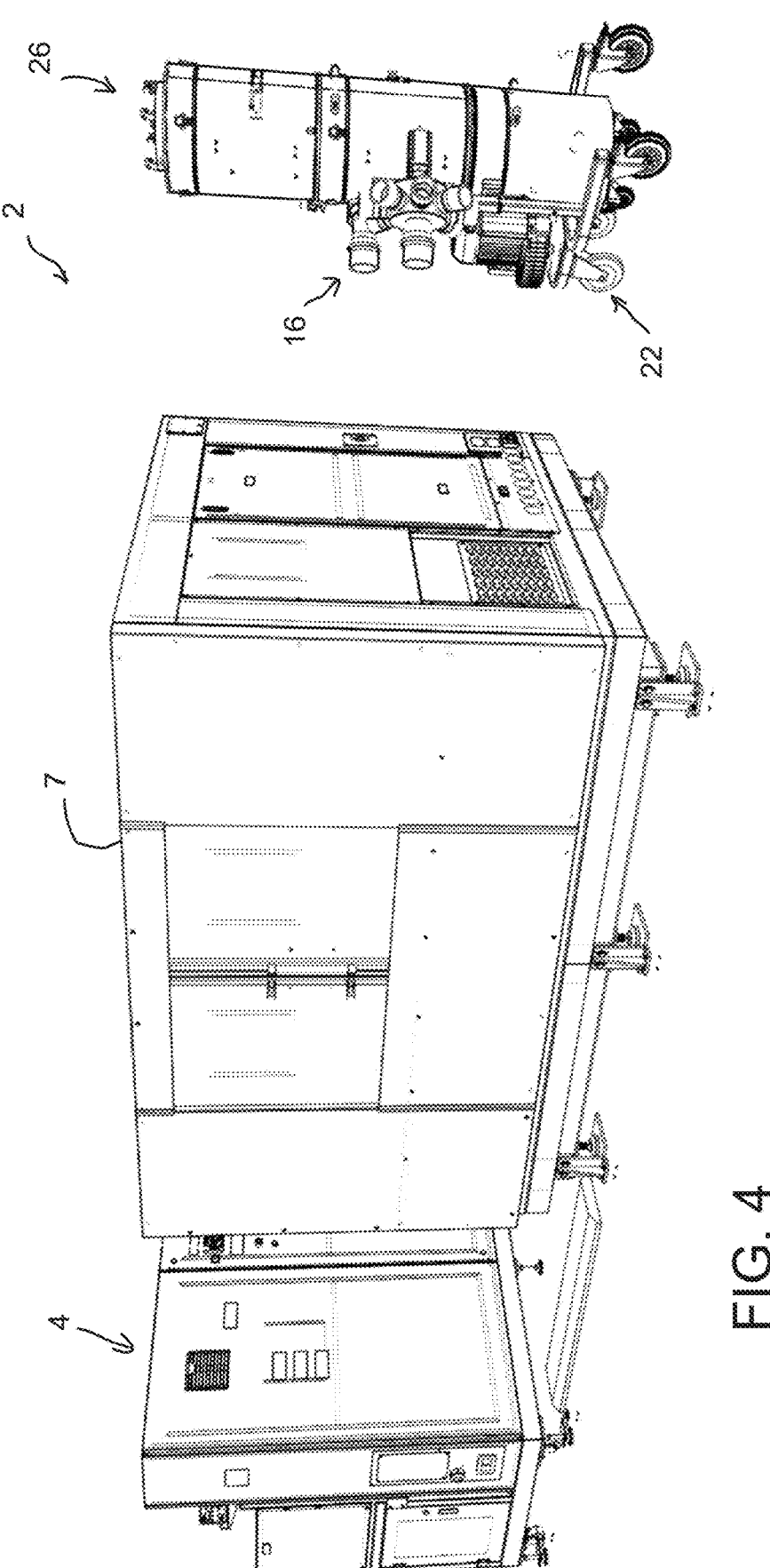
FIG. 4 is a diagrammatic perspective view of the laser processing system prior to assembly of the various components with one another.

As shown in those figures, the Optical Laser Engine assembly 6 of FIGS. 1-3 comprises an exterior housing 30 in which houses the various components of the Optical Laser Engine assembly 6. The laser beam generation source 4 generates a laser beam which is reflected, e.g., by a plurality of reflective mirrors RM (see FIG. 11), from the laser beam generation source 4 toward the Optical Laser Engine assembly 6 accommodated within the enclosure 7. This reflected laser beam pulses 32 forms a pulsed laser beam input to the Optical Laser Engine assembly 6. As is conventional in the art and diagrammatically shown in FIG. 12, the Optical Laser Engine assembly 6 includes a galvanometer system (e.g., a pair of motorized reflective mirrors MM which are rotated by a respective motor M and controlled by a laser system controller 28) for receiving the supplied laser beam input, from the laser beam generation source 4, and redirecting the laser beam pulses 32 out through a laser beam output aperture 34 toward a desired region 36, e.g., a desired point on the surface, which is to be processed by the laser beam pulses 32. The motorized reflective mirrors MM are controlled by the laser system controller 28 to precisely and accurately reflect the laser beam pulses 32 toward the desired point, area or region 36 to be processed. The laser beam outlet aperture 34 (see FIG. 3D), for outputting the reflected laser beam from the Optical Laser Engine assembly 6 at a desired point, area or region 36, is formed in a bottom, down facing surface 40 of the exterior housing 30 (see FIG. 3), which houses the components of the Optical Laser Engine assembly 6. As the generation of the laser beam and reflecting/redirecting of the same, via the Optical Laser Engine assembly 6, is conventional and well known in the prior art, a further detail description concerning the same is not provided.

The surface to be processed may be, for example, a 500 mm×500 mm circuit board, a microelectronic substrate, or some other a desired surface or material to be processed 36. It is to be appreciated that either larger or smaller surfaces or various other types of material, items or objects may be processed, as generally described herein, without departing form the spirit and scope of the present disclosure.

A preferred circuit board to be processed by the laser processing system 2 generally comprises a central core layer manufactured from FR4, for example. A relatively thin later of oxide copper is adhered, in a conventional manner, to each opposed surface of the central core layer. In addition, an ABF laminate is applied over the entire exposed surfaces on both sides of the oxide copper, in a conventional manner, so as to form the resulting circuit board which has five separate layers. Thereafter, the resulting circuit board may be utilized to manufacture individual printed circuits in a conventional manner. However, prior to fabrication of the individual printed circuits, it is desirable to remove completely only the ABF laminate layer from the entire exterior perimeter of the circuit board (on both sides) while, at the same time, not removing any portion of the oxide copper layer or the central core layer and also preventing the oxide copper layer from becoming separated or delaminated from the central core layer. Accordingly, during the laser ablation process, it is necessary to control the amount of heat that is conveyed to and accumulates in the oxide copper layer so that such heat is suitable removed and/or dispersed without any delamination or separation of the oxide copper layer from the central core layer occurring. The integrated debris/gas/vapor plume extraction system, according to the present disclosure, is directed at avoiding the accumulation of heat in the oxide copper layer as well as avoiding delamination/separation of the oxide copper layer from the central core layer.

Figure 11:
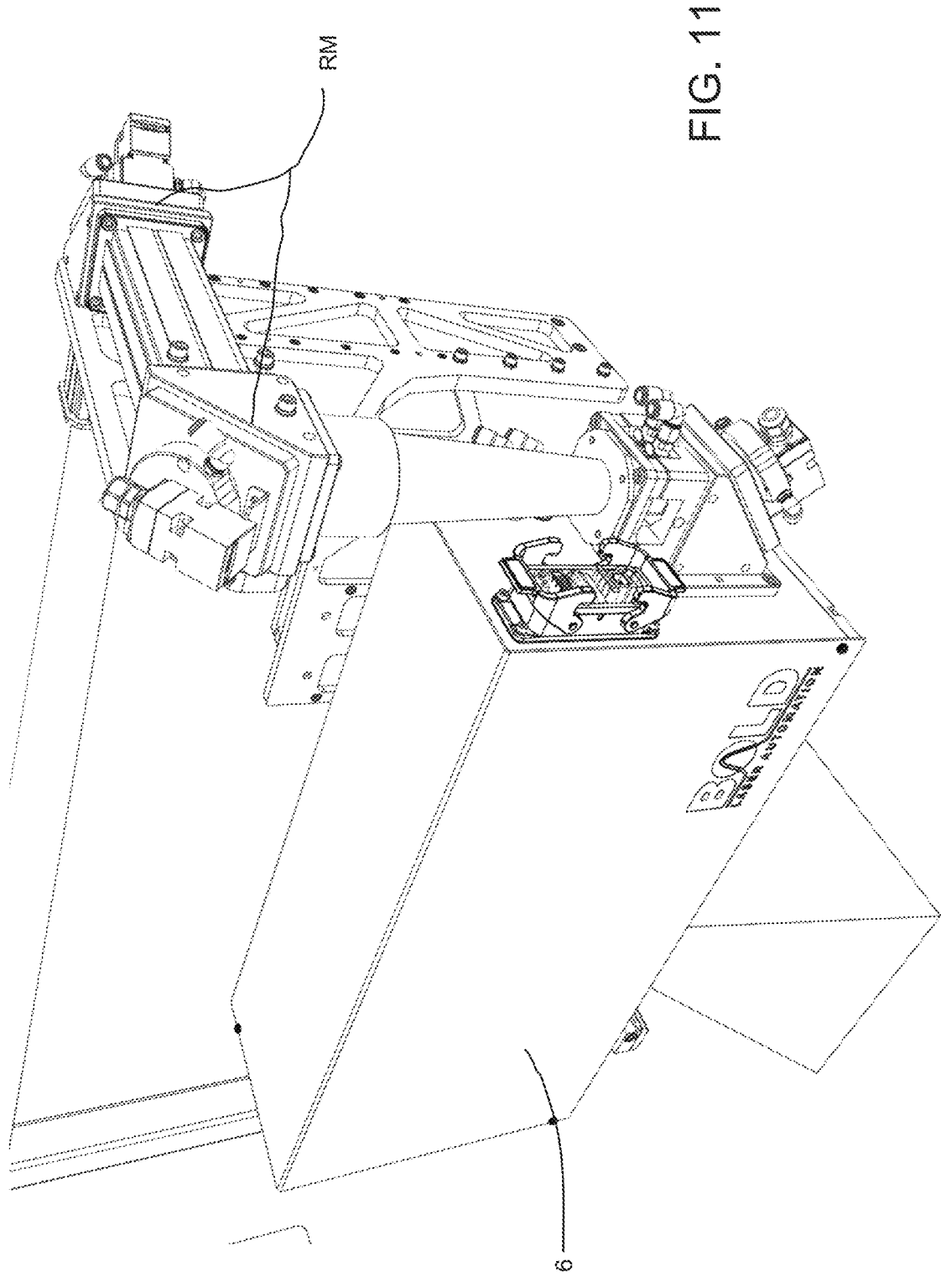
FIG. 11 is a diagrammatic perspective view showing conveyance of the generated laser pulses from the laser beam generation source to the Optical Laser Engine assembly.
Figure 12:
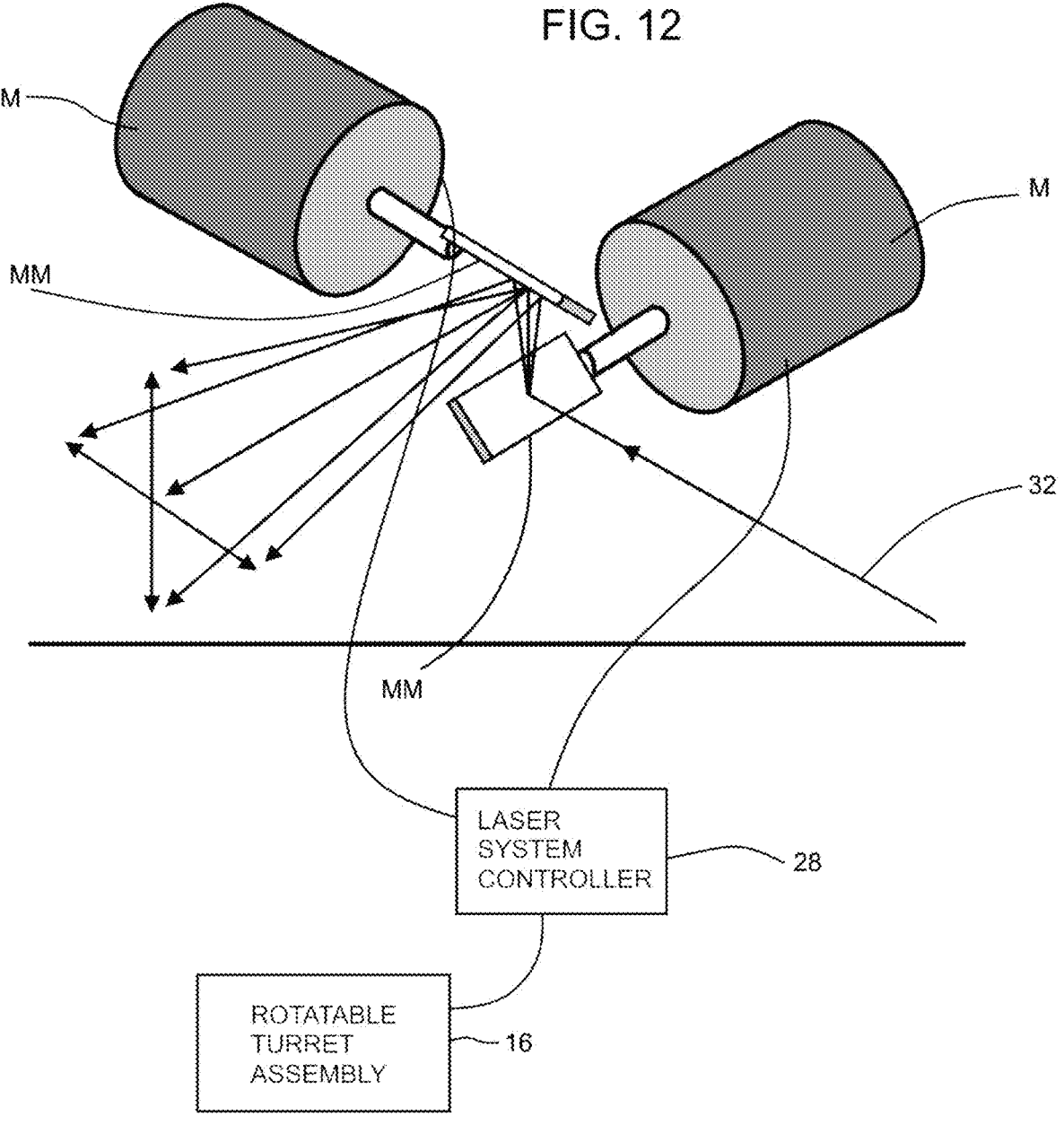
FIG. 12 is a diagrammatic perspective view showing the galvo mirrors of the Optical Laser Engine assembly.

As diagrammatically shown in FIGS. 1, 2 and 11, the input laser pulses 32 from the laser beam generation source 4 are redirected by the Optical Laser Engine assembly 6 toward a desired point, area or region 36 of the circuit board, the microelectronic substrate, or the surface or material to be processed. As the plurality of laser pulses 32 impact against the surface to be processed 36, the top (laminate) layer of the surface to be processed is rapidly consumed, generally by combustion thereof, thereby generating a plume of smoke as well as associated combustion debris PD. The integrated debris/gas/vapor plume extraction system, according to the disclosure, is designed to evacuate and extinguish such combustion of the top (laminate) layer of the surface being processed, as soon as possible, so that the combustion is limited solely to the area intended and desired to be consumed by the laser pulses 32 but without the combustion spreading and/or migrating into the surrounding region of the top (laminate) layer. The integrated high velocity debris/gas/vapor plume extraction system, according to the disclosure, is designed to rapidly and efficiently remove the plume and the associated combustion debris PD.

As generally noted above, this plume also typically includes small particles of ablated debris PD, which tends to collect and accumulate directly above and around the area being processed by the laser beam (see FIG. 2). It is to be appreciated that the plume and the debris PD may hinder, to some degree, the desired processing of the circuit board, the microelectronic substrate, or the surface or material to be processed by the laser beam 36. Accordingly, the effects of the plume and debris PD are to be minimized, as much as possible, during processing of the circuit board, the microelectronic substrate, or the surface or material to be processed 36.

In order to achieve adequate removal of the plume and associated debris PD, a plurality of high velocity plume/debris extraction segments 12, 14 are arranged, side-by-side and adjacent one another, generally around the entire perimeter of the circuit board, the microelectronic substrate, or the surface or material to be processed 36. Each one of the plurality of high velocity plume/debris extraction segments 12, 14 is located closely adjacent the surface or material to be processed 36 and is designed to draw or suck in the plume and the associated debris PD, generated by laser beam during processing, as rapidly as possible so as to remove the same from the area being processed 36 by the laser pluses 32 and thereby avoid hindering the desired processing of the circuit board, the microelectronic substrate, or the surface or material to be processed 36. It is to be appreciated that the high velocity drawn or sucked exhaust stream also assist, to some extent, with cooling of the area being processed 36 by the laser beam.

Each one of the high velocity plume/debris extraction segments 12, 14 is designed to generate substantially laminar flow into the associated inlet nozzle 38 which has a velocity of between 100 and 1500 cubic feet per minute and more preferably a velocity between 200 and 800 cubic feet per minute into the inlet nozzle 38 so that such high velocity airflow assists with removing any generated debris and/or potentially harmful gases as well as preventing re-solidification of such removed debris back on the surface being processed.

Typically, as generally shown in FIG. 7C for example, the inlet nozzle 38 of each one of plurality of high velocity plume/debris extraction segments 12, 14 lies in a common plane which extends parallel to, but is slightly offset and located slightly vertically above, e.g., typically less than 2 inches, a top surface of the circuit board, the microelectronic substrate, or the surface or material to be processed 36. Such arrangement generally assists the plurality of high velocity plume/debris extraction segments 12, 14 with being located closely adjacent and rapidly removing the generated plume and associated debris PD from the area currently being processed 36 by the laser as soon as the same is generated. A further detailed discussion concerning addition features of the high velocity plume/debris extraction segments 12, 14 and its function will be provided below.

The bottom, down facing surface 40 of the housing 30 also supports a laser triangulation device 42 (see FIGS. 1 and 3). The laser triangulation device 42 is typically located adjacent, but space a small distance from, the laser beam outlet aperture 34. The laser triangulation device 42 faces toward but is also spaced from the top surface of the circuit board, the microelectronic substrate, or the surface or material to be processed 36. During processing of the circuit board, the microelectronic substrate, or the surface or material to be processed by the laser beam pulses 32, the laser triangulation device 42 is able to detect, via utilization of conventional triangulation techniques, any variation in the relative distance between the Optical Laser Engine assembly 6 and the top surface of the circuit board, the microelectronic substrate, or the surface or material to be processed 36. The laser triangulation device 42 communicates with the laser system controller 28 to assist with adjusting the relative positions between those two components, as necessary, in order to achieve the desired ablation of the circuit board, the microelectronic substrate, or the surface or material to be processed 36.

During operation, the laser triangulation device 42 determines an optimum focus position and maintains such optimum focus position as the material, being processed by the laser, moves, is flatness and/or its topography changes and/or shifts, during such processing, thereby inducing a required change in focus. The laser triangulation device 42 sends an analog signal to the pre scanner objective to correct for such shift and/or change as well as to the Z-axis controller (not shown in detail) which correspondingly adjusts the position of the Optical Laser Engine assembly 6, along the Z-axis, relative to the surface being processed 36. As such triangulation techniques are conventional and well known in the art, a further detailed description concerning same is not provided.

In addition, the lower bottom surface 40 of the housing 30, which houses the Optical Laser Engine assembly 6, also supports a pressure air knife 44 (see FIG. 2). The air knife 44 is located closely adjacent, but space from, the laser beam outlet aperture 34. Typically, a longitudinal axis of the air knife 44 is arranged so as to form an angled of between 4 and 20 degrees or so with the bottom surface 40 of the housing 30 of the Optical Laser Engine assembly 6. It is to be appreciated that for highly energetic $CO^2$ laser processing (e.g., in excess of 500 Watts), the located closely adjacent, but space from, the laser beam outlet aperture 34. Typically, the longitudinal axis of the air knife 44 may optimally form an angle of 12 degrees or so with the bottom surface 40 of the housing 30 while, for lower power laser processing, an air knife angle of about 8 degrees or so, with the bottom surface 40 of the housing 30 of the Optical Laser Engine assembly 6, is generally sufficient. The air knife 44, during operation, emits a continuous stream of gas or air, e.g., air or possibly an inert gas, which forms a flow barrier or curtain, between the laser beam outlet aperture 34 and the generated plume and debris PD, so as to prevent any portion of the plume and/or the debris from flowing toward and entering, via the laser beam outlet aperture 34, into the internal compartment of the Optical Laser Engine and, thereafter, possibly effecting operation of the Optical Laser Engine assembly 6.

According to the disclosure, the Optical Laser Engine assembly 6 comprises the laser system controller 28 which, as the laser scans at a high rate of speed, synchronizes 1) the laser scanner, 2) the laser focusing, 3) the pulse rate of the laser, and/or 4) the modulation rate of the laser so as to deposit equal power and/or pulses onto the layer/material being processed on the surface being treated, in harmonization with the suction/extraction/removal of the plume and the associated debris PD, formed during the laser ablation processing, by the desired one or more of the high velocity plume/debris extraction segments 12, 14 of the integrated debris/gas/vapor plume extraction system. This synchronization is based on interpolated motion control, where all the axes of motion (i.e., the X-axis, the Y-axis and the Z-axis) are synchronized with the laser modulation and/or the pulse sequence in conjunction with the integrated debris/gas/vapor plume extraction system. It is to be appreciated that this is crucial, since the highly energetic processes are typically less than 2 seconds in duration and the generated plume and debris PD creates a relatively large formation directly above and around the area being processed 36 that must be anticipated and mitigated by synchronized timing with the laser beam and motion of the various components.

As noted above, the present disclosure relates to integrated debris/gas/vapor plume extraction system which comprises a plurality of separate high velocity plume/debris extraction segments 12, 14 which are each connected, via a respective vacuum hose, to one of the inlet ports 18 of the rotatable turret assembly 16.

The dust collector separator 22 which is divided, by an internal filter 46, into a lower chamber 48 and an upper chamber 50. As the larger particles enter into the lower chamber 48 of the dust collector separator 22, they generally migrate toward the bottom of the lower chamber 48 while the filter 46 is designed to separate and remove any finer particulate matter from the exhaust stream and prevent the same from flowing through the filter 46 and into the upper chamber 48. A separator exhaust outlet 52 is provided in the upper chamber 50 of the dust collector separator 22 and the separator exhaust outlet 52 is connected, by a blower hose 51, to a blower inlet 54 of the blower 24 while a blower discharge outlet (not shown in detail) communicates with and exhausts the exhaust stream directly into the surrounding environment.

As a result of this arrangement, as the blower 24 operates, the blower 24 creates a negative pressure and such negative pressure draws or sucks in the generated plume and debris PD (e.g., the exhaust stream) through the inlet nozzle 38 a selected one or associated pair of the discrete high velocity plume/debris extraction segments 12, 14. This drawn in exhaust stream then flows through and exits from the respective high velocity plume/debris extraction segment(s) 12, 14, flows along the associated segment hose(s) toward the rotatable turret assembly 16. The exhaust stream enters the rotatable turret assembly 16 through one of the turret inlet ports 18, and flows along the radial and axial passages 66, 68 of the turret 60 and then exits the rotatable turret assembly 16 via the centrally located outlet port 64. The exhaust stream then flows toward and is discharged into the lower chamber 48 of the dust collector separator 22. The larger particles gradually migrate toward and settle on the bottom of the lower chamber 48 while the exhaust stream flows upward through the filter 46 and into the upper chamber 50. Thereafter, the exhaust stream then exits, via separator exhaust outlet 52, and flows along the blower hose 51 to and through the blower 24 before being subsequently discharged, via the blower discharge outlet of the blower 24, directly into the surrounding environment.

It is to be appreciated that the filter 46 may, for some applications, be a bed of activated charcoal, for example, which is suitable for removing any toxic and/or undesired gases and compounds from the exhaust stream before the same is finally discharged, by the blower 24, directly into the surrounding environment.

Figure 7:
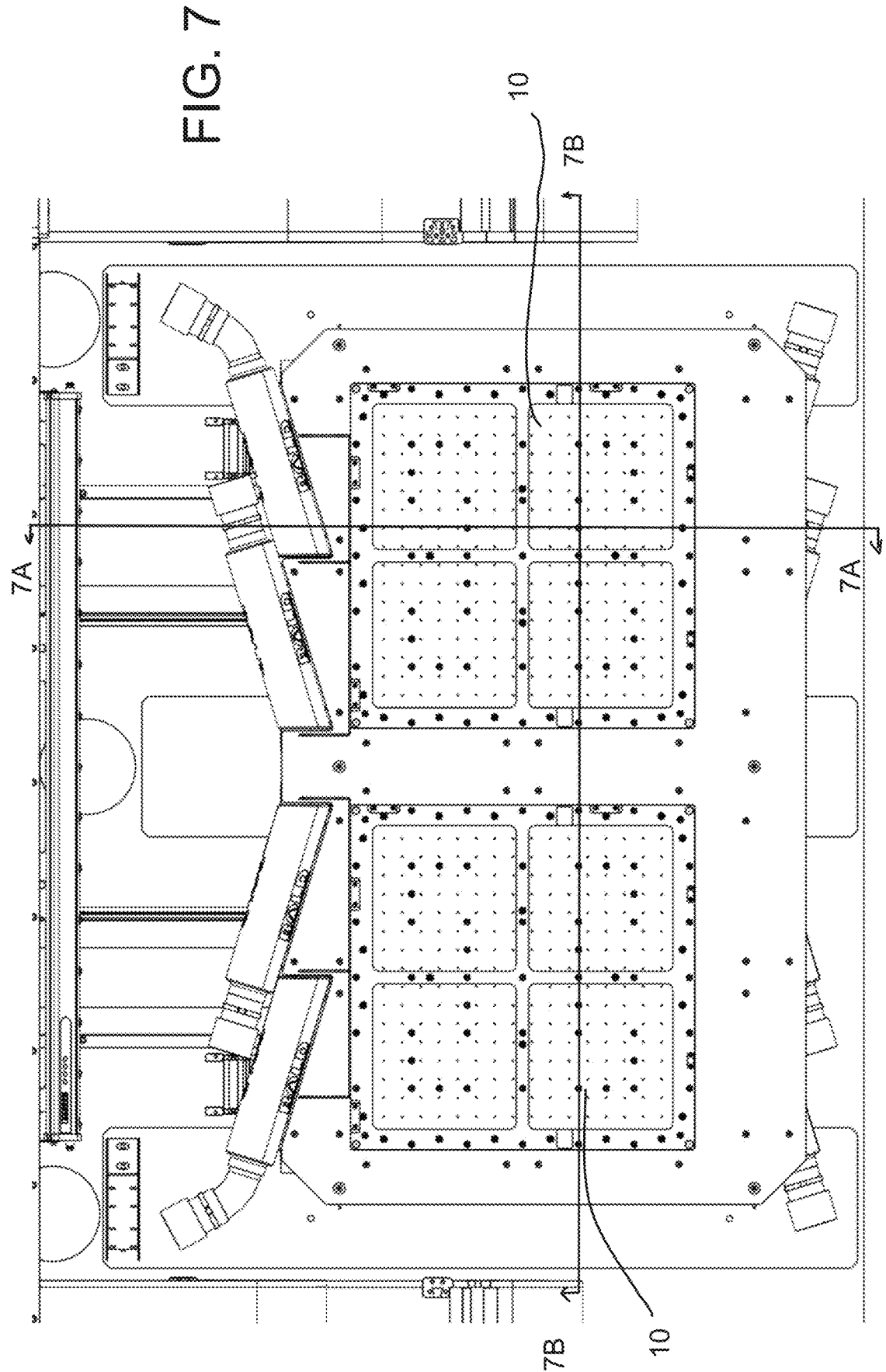
FIG. 7 is a diagrammatic top plan view of a first and second movable tables according to the disclosure.
Figure 7A:
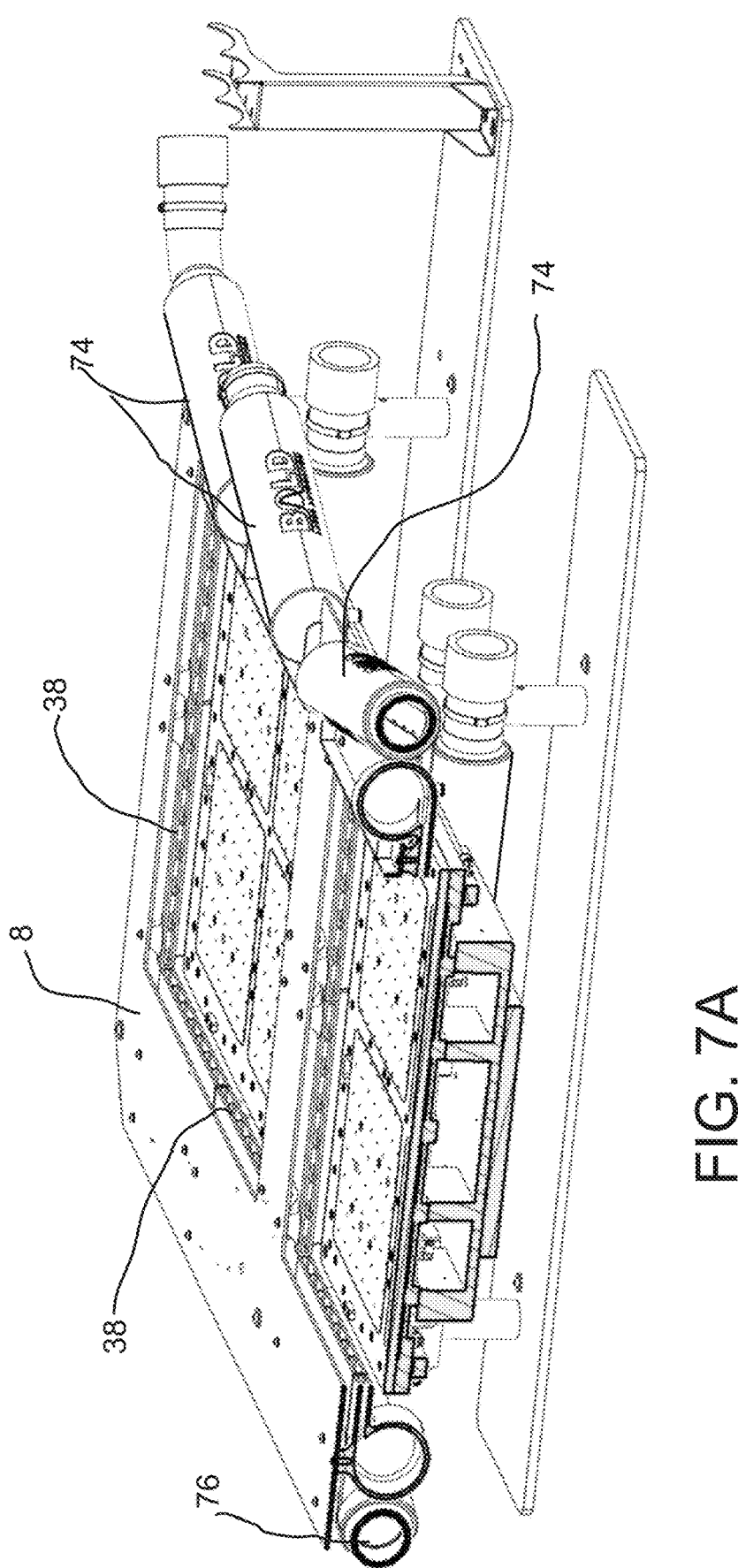
FIG. 7A is a diagrammatic sectional perspective view along section line 7A-7A of FIG. 7.
Figure 7B:
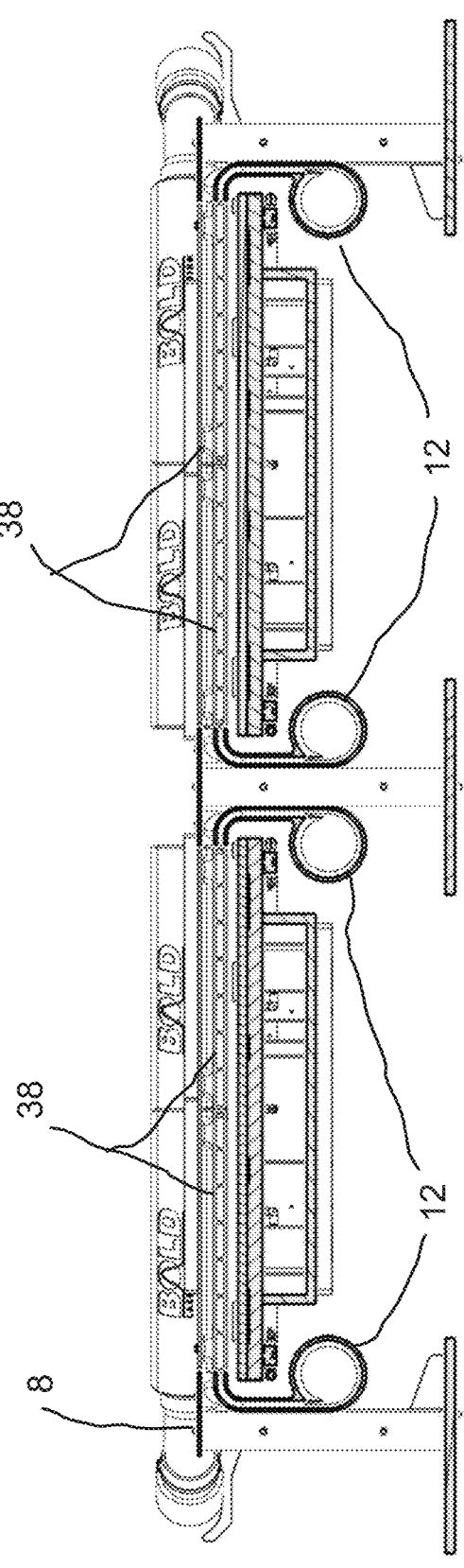
FIG. 7B is a diagrammatic sectional view along section line 7B-7B of FIG. 7.

As generally shown in FIGS. 7A and 7B for example, the high velocity vacuum system comprises a plurality of individual and discrete high velocity plume/debris extraction segments 12, 14. The discrete high velocity plume/debris extraction segments 12, 14 are typically arranged, side by side adjacent one another, substantially around the entire perimeter of the area to be processed 36. Each one of the high velocity plume/debris extraction segments 12, 14 is mounted, by one or more conventional fasteners for example, to an undersurface of a table framework 8 so as to be located closely adjacent a top surface of the desired area to be processed 36 to facilitate drawing or sucking in the generated plume and debris PD into the inlet nozzle(s) 38 of the activated one or more of the discrete high velocity plume/debris extraction segments 12, 14, the purpose of which will become apparent from the following discussion. In addition, as noted above, each one of the discrete high velocity plume/debris extraction segments 12, 14 is connected to the common vacuum source 26, via respective segment hoses, to subject the selected one or more of the discrete high velocity plume/debris extraction segments 12, 14 to the created negative pressure (suction).

Figures 8, 13:
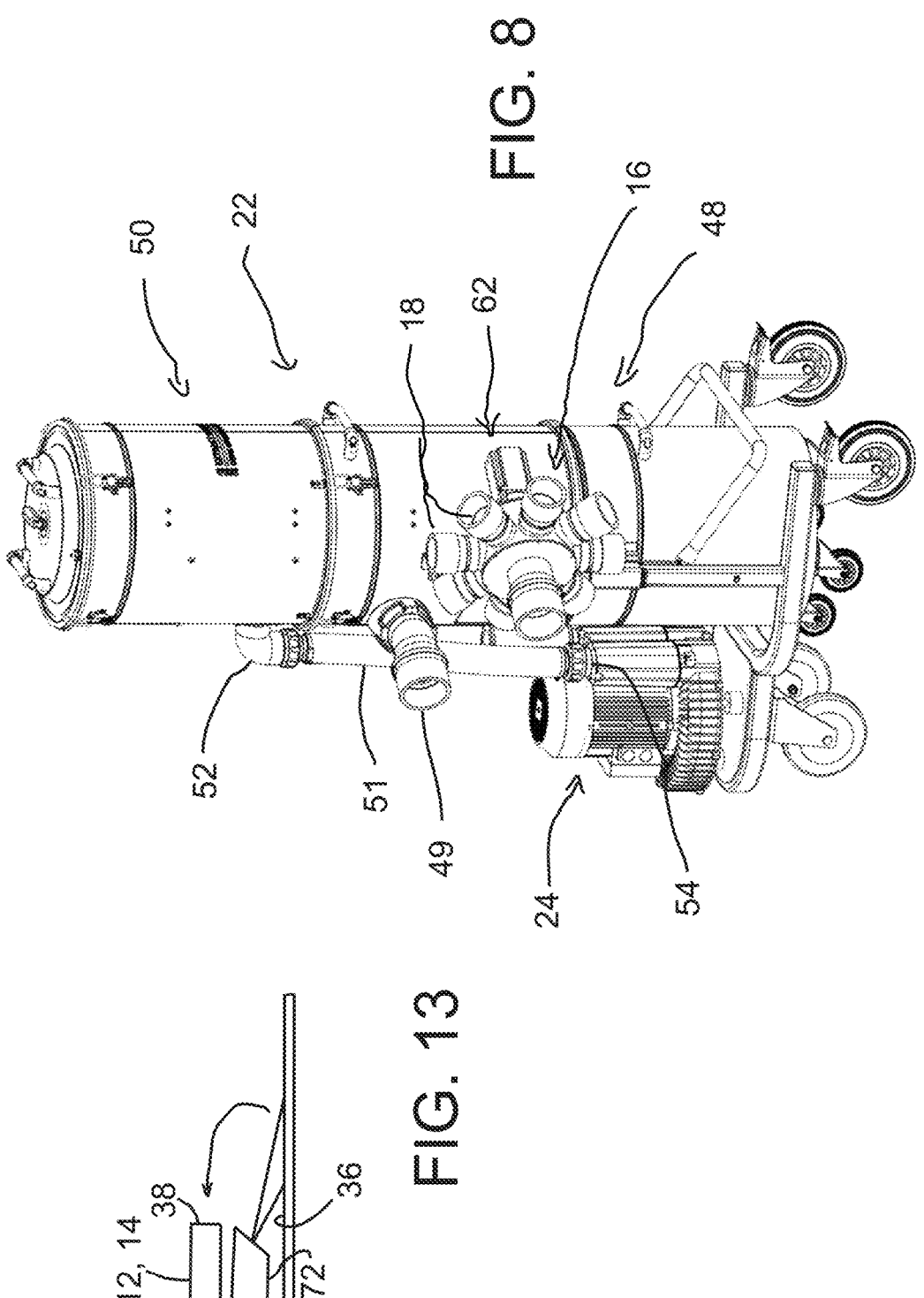
FIG. 8 is a diagrammatic perspective view of a dust collector separator supporting the rotatable turret assembly and the blower according to the disclosure.
FIG. 13 is a diagrammatic perspective view showing a combustion prevention/cooling knife located between a high velocity plume/debris extraction segment and a top surface of the circuit board.
Figure 9A:
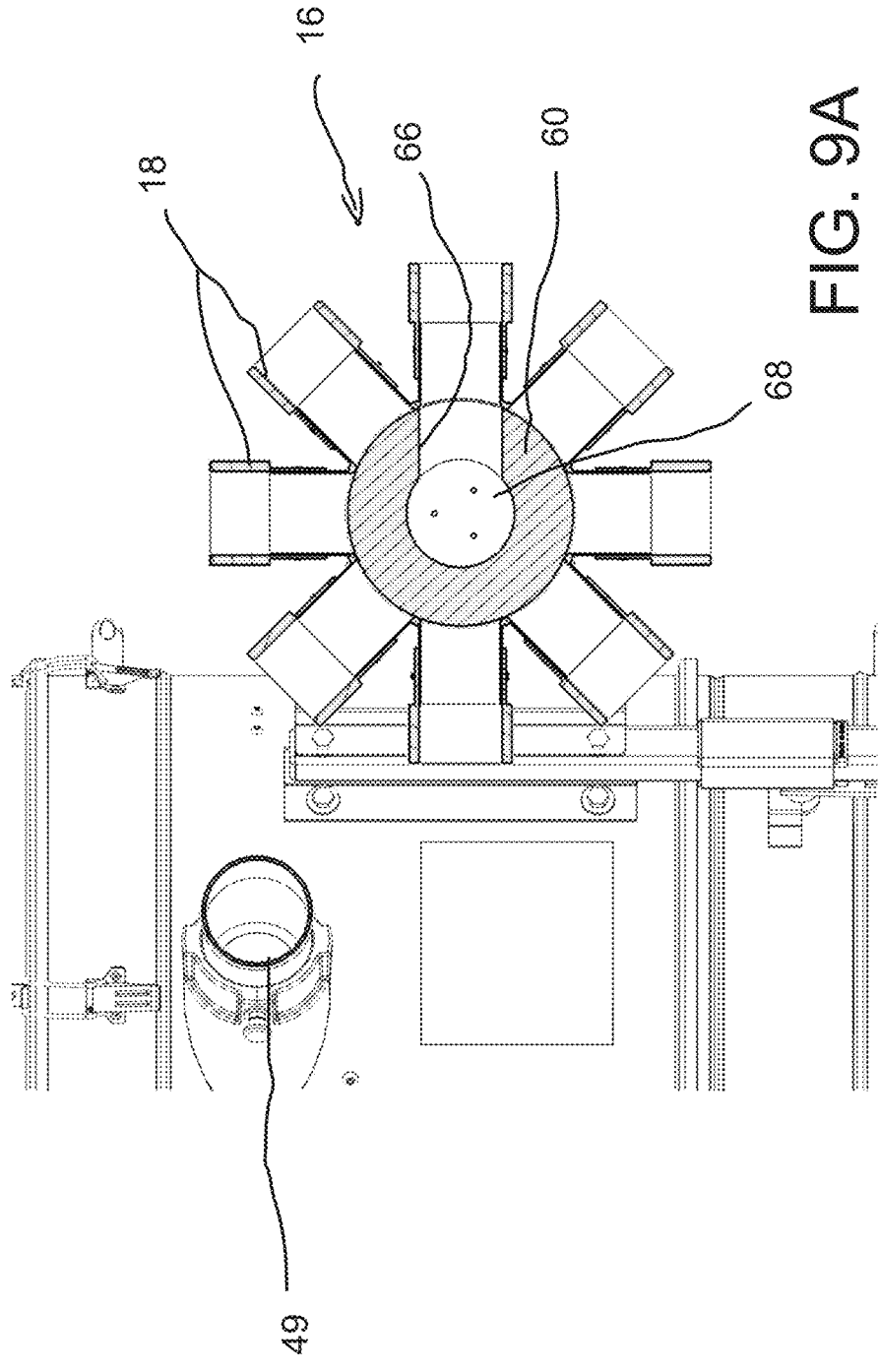
FIG. 9A is a diagrammatic cross sectional view through the rotatable turret assembly of FIG. 8 according to the disclosure.
Figure 9B:
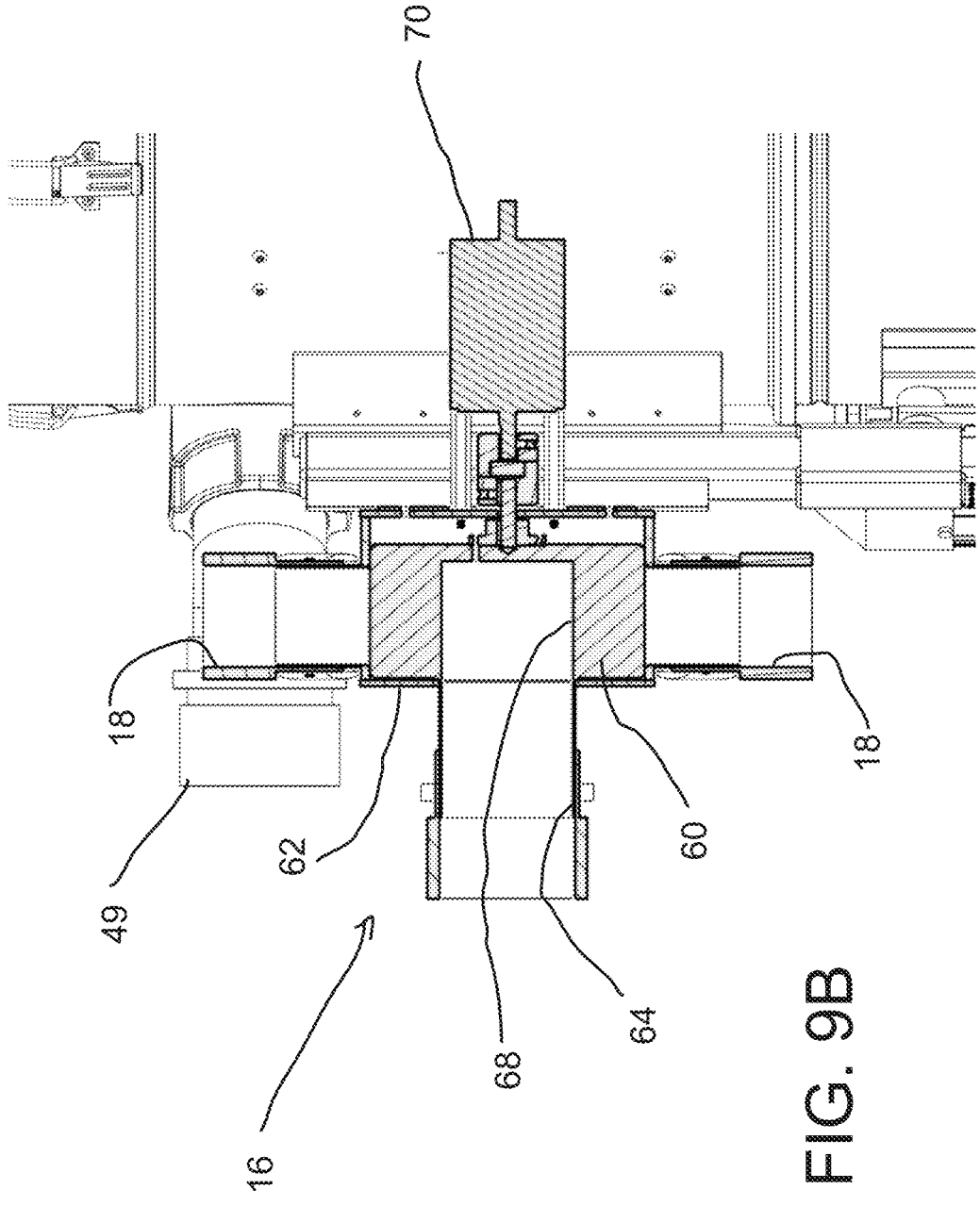
FIG. 9B is a diagrammatic cross sectional view through the rotatable turret 12 assembly, in a direction normal to the view shown in FIG. 9A, according to the disclosure.

A turret 60 is rotatably accommodated within a cylindrical turret housing 62. The turret housing 62 has a plurality of inlet ports 18, e.g., eight inlet ports 18 are shown in FIGS. 8 and 9A, formed therein as well as a centrally located outlet port 64. The turret 60 is generally cylindrically shaped and is a solid member that is rotatable. The turret 60 has a single radial passage 66 formed therein which communicates with a centrally located axial outlet passage 68. The turret 60 is connected to a conventional step motor 70 which facilitates rotation of the turret 60 to selectively control which one of the plurality of inlet ports 18 and, in turn, which one or pair of the high velocity plume/debris extraction segment(s) 12, 14, will be connected to the common vacuum source 26 and thus subjected to the generated negative pressure. Since the turret 60 only has a single radial passage 66 and centrally located axial outlet passage 68, during operation only one of the plurality of inlet ports 18 can be subjected to the negative pressure. The step motor 70 is electrically connected to and controlled by the laser system controller 28 to rotate the turret 60 and align the single radial passage 66 with a desired one of the plurality of inlet ports 18. It is to be appreciated that the single radial passage 66 may have non-cylindrical shape which is designed, as the turret 60 is rotated by the motor 70, to initiate subjecting negative pressure to the next desired inlet port 18 before the negative pressure to the previous inlet port 18 is completely discontinued.

The common vacuum source 26 generally comprises a dust collector separator 22 which is divided by the filter 46 into a lower chamber 48 and an upper chamber 50. The filter 46 is designed to separate any fine particulate matter from the exhaust stream and prevent the same flowing further downstream into the upper chamber 50. The separator exhaust outlet 52 is provided in the upper chamber 50 of the dust collector separator 22 and the separator exhaust outlet 52 is connected to the blower inlet 54 of the blower 24 while the blower outlet communicates directly with the surrounding environment. As a result of this arrangement, as the blower 24 operates, the blower 24 draws an exhaust flow in through the inlet nozzle(s) 38 of a selected one or pair of discrete high velocity plume/debris extraction segments 12, 14. This exhaust stream then flows along the associated segment hose or hoses, to one of the inlet ports 18 of the rotatable turret assembly 16. The exhaust stream then flows out through the central exhaust outlet of the rotatable turret assembly 16, through the turret hose and into the lower chamber 48 of the dust collector separator 22. The exhaust stream then flows up through the filter 46 into the upper chamber 50 before the exhaust stream exits through the separator exhaust outlet 52. The exhaust stream then flows into the blower inlet 54, though the blower 24 and is eventually discharged into the surrounding environment via the blower outlet.

A combustion prevention/cooling knife 72 may be located between a bottom surface of each one of plurality of high velocity plume/debris extraction segments 12, 14 and the top surface of the circuit board, the microelectronic substrate, or the surface or material to be processed. Each one of these combustion prevention/cooling knives 72, similar to the high velocity plume/debris extraction segments 12, 14, is arranged, side-by-side and adjacent one another, generally around the entire perimeter of the circuit board, the microelectronic substrate, or the surface or material to be processed. Each one the combustion prevention/cooling knives 72 has an outlet slot or opening (only diagrammatically shown), formed in an end face thereof, which is angled slightly downward toward the perimeter edge of the top surface of the circuit board, the microelectronic substrate, or the surface or material to be processed. During operation, each of the combustion prevention/cooling knives 72 is typically supplied with an inert gas, such as argon or nitrogen, from a source of an inert gas. This inert gas is directed out through the outlet slot or opening of the respective combustion prevention/cooling knife 72 toward the edge of the top laminate layer and at a desired velocity which assists with rapidly extinguishing combustion of the laminate layer being ablated by the laser beam pulses 32. This flow of inert gas is designed to minimize further combustion of the top laminate layer and also assists with cooling of the oxide copper layer which assist with avoiding delimination/separation of the oxide copper layer from the central core layer. The flow of inert gas, discharged from the outlet slots or opening formed in end face of the air knives 72, is designed so as to exit therefrom as a laminar flow which assist with avoiding the creation of turbulence in and around the vicinity of the area being treated 36 by the laser pulses 32 and is sucked into the inlet nozzle(s) 38 of the adjacent the high velocity plume/debris extraction segments 12, 14 (see FIG. 13).

As generally shown in the drawings, the turret housing 62 has eight separate inlet ports 18 with a respective vacuum hose connected to each one of those inlet ports 18. The turret 60 is accommodated within the turret housing 62 and the turret 60 is rotated by the step motor 70. A central portion of a turret is hollow and this hollow section of the turret 60 communicates with an exhaust outlet of the turret housing 62. A turret hose has a first end connected to the exhaust outlet of the turret housing 62 while the opposite end of the turret hose is connected to the separator inlet 49 which communicates with the lower chamber 48. The step motor 70 is controlled by the laser system controller 28 for selectively determining which one of the eight inlet ports 18 will be connected to the vacuum source 26 and thus subjected to negative pressure.

As generally shown in FIGS. 7 and 7A, a work area of the Optical Laser Engine assembly 6 comprises first and second adjacent slidable tables 10 which are each designed to support a desired circuit board, microelectronic substrate, or other surface or material to be processed 36. During operation, typically the Optical Laser Engine assembly 6 will process the circuit board, the microelectronic substrate, or the surface or material to be processed 36 located on the one of the tables 10, e.g., the first slidable table 10, while the other table 10, e.g., the second slidable table 10, is automatically moved away from the work area in order to either flip over the circuit board, the microelectronic substrate, or the surface or material to be processed 36 to facilitate treating the opposite side thereof or the circuit board, the microelectronic substrate, or the surface or material to be processed may be replaced with a new circuit board, microelectronic substrate, or surface or material to be processed. Once the circuit board, the microelectronic substrate, or the surface or material to be processed on the second table 10 is either flipped over or replaced with a new circuit board, microelectronic substrate, or surface or material to be processed, the second slidable table 10 is then moved back to the work area and is thus ready to be processed by the Optical Laser Engine assembly 6.

Once processing of the circuit board, the microelectronic substrate, or the surface or material to be processed supported by the first table 10 is completed, then the first table 10 can be move away from the working area while the Optical Laser Engine assembly 6 commences an ablation operation on the circuit board, the microelectronic substrate, or the surface or material to be processed supported by the second table 10. While this is occurring, the circuit board, the microelectronic substrate, or the surface or material to be processed, supported by the first slidable table 10, may be moved away from the work area and either flipped over to facilitate treating the opposite side or may be replaced with a new circuit board, microelectronic substrate, or surface or material to be processed. Once the circuit board, the microelectronic substrate, or the surface or material to be processed on the first table 10 is either flipped over or replaced with a new circuit board, microelectronic substrate, or surface or material to be processed, then the first slidable table 10 is moved back to the work area and is thus ready to be processed by the Optical Laser Engine assembly 6. The above process is repeatedly repeated as necessary in order to reduce production time.

Figures 5A, 5B:
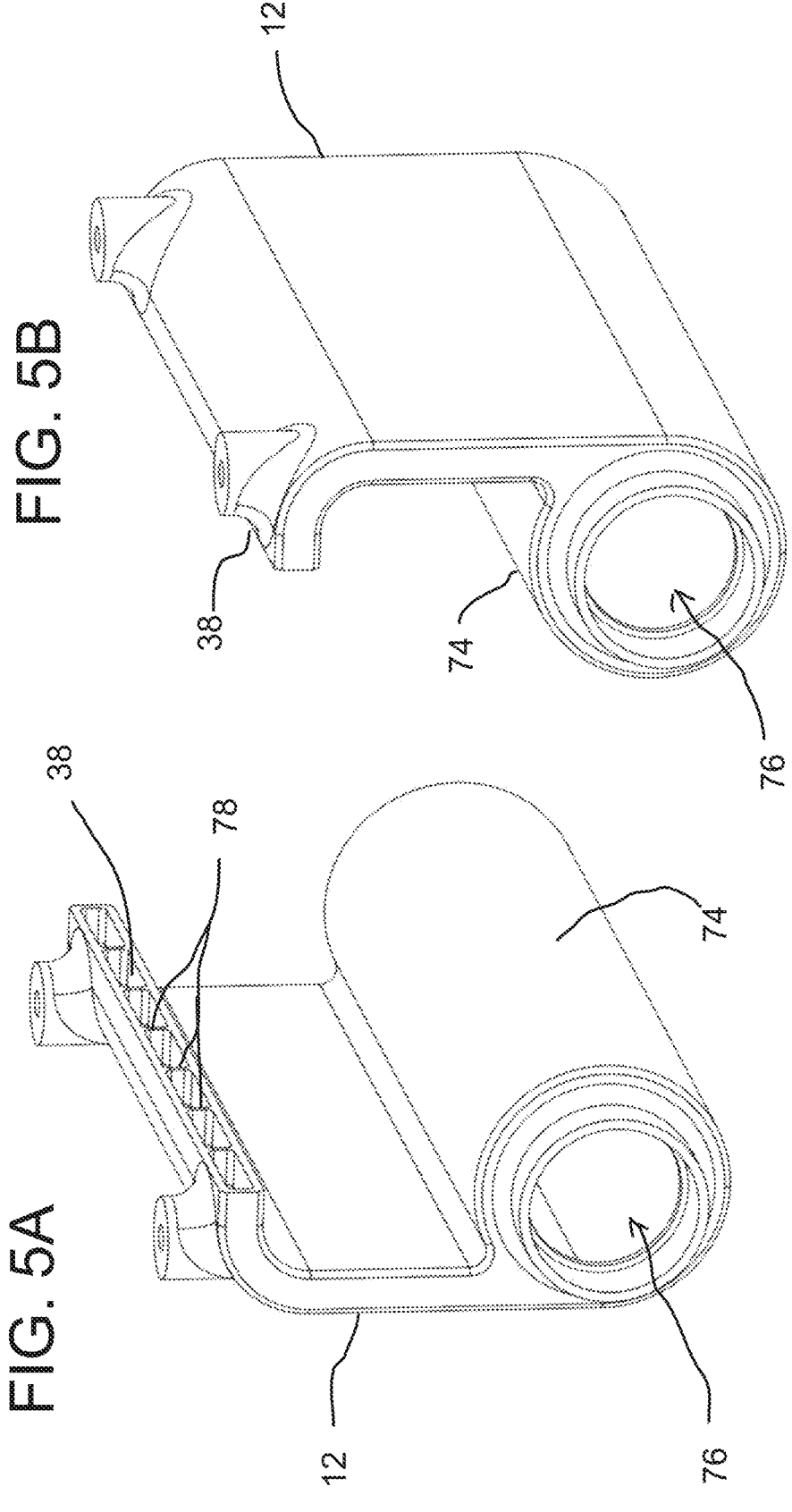
FIG. 5A is a top, left, front diagrammatic perspective view of a first design of a high velocity plume/debris extraction segments to be supported along a left lateral side of the table according to the disclosure.
FIG. 5B is a top, right, rear diagrammatic perspective view of a first design of a high velocity plume/debris extraction segments to be supported along a right lateral side of the table according to the disclosure.
Figure 6A:
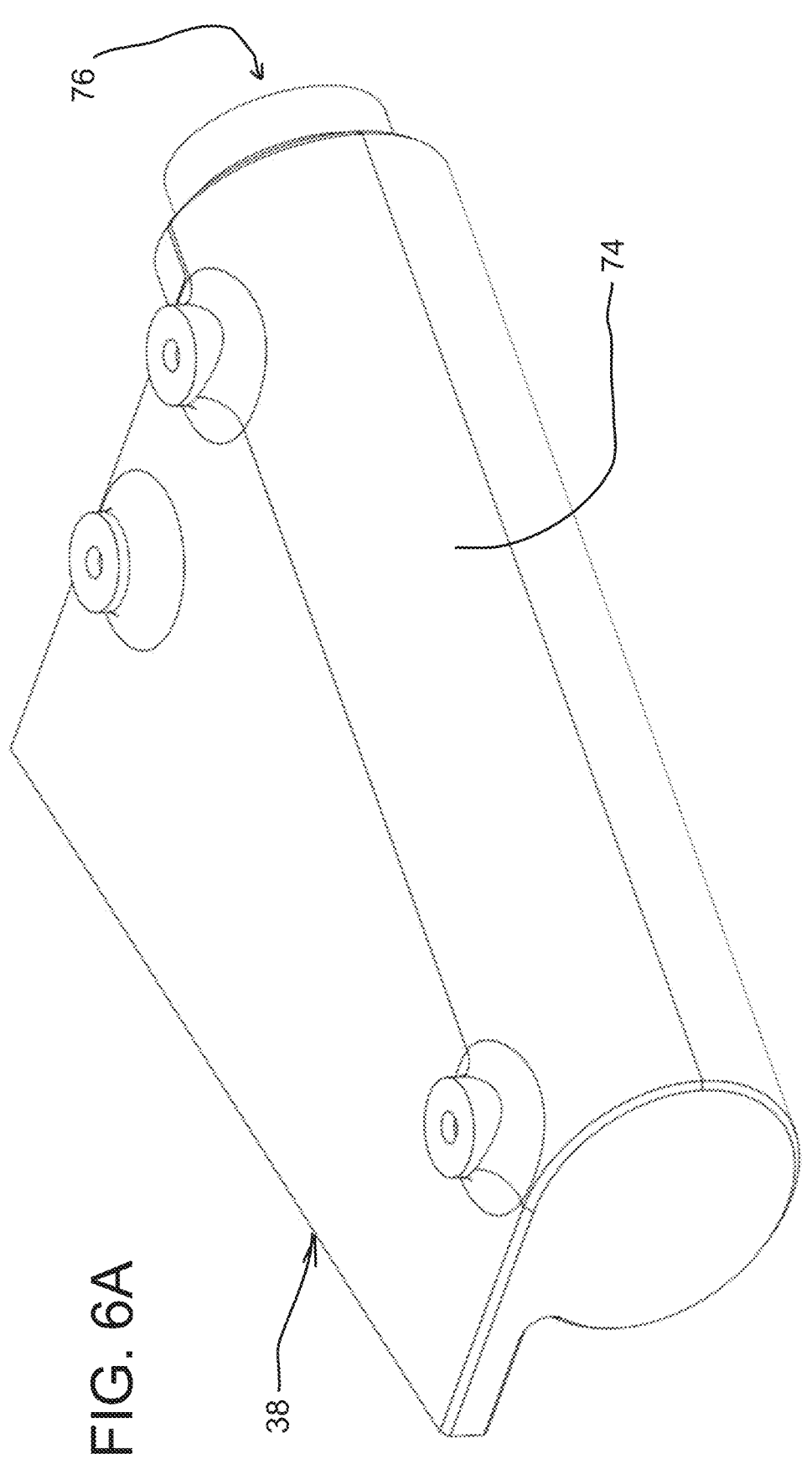
FIG. 6A is a top, left, rear diagrammatic perspective view of a second design of a high velocity plume/debris extraction segments according to the disclosure.
Figure 6B:
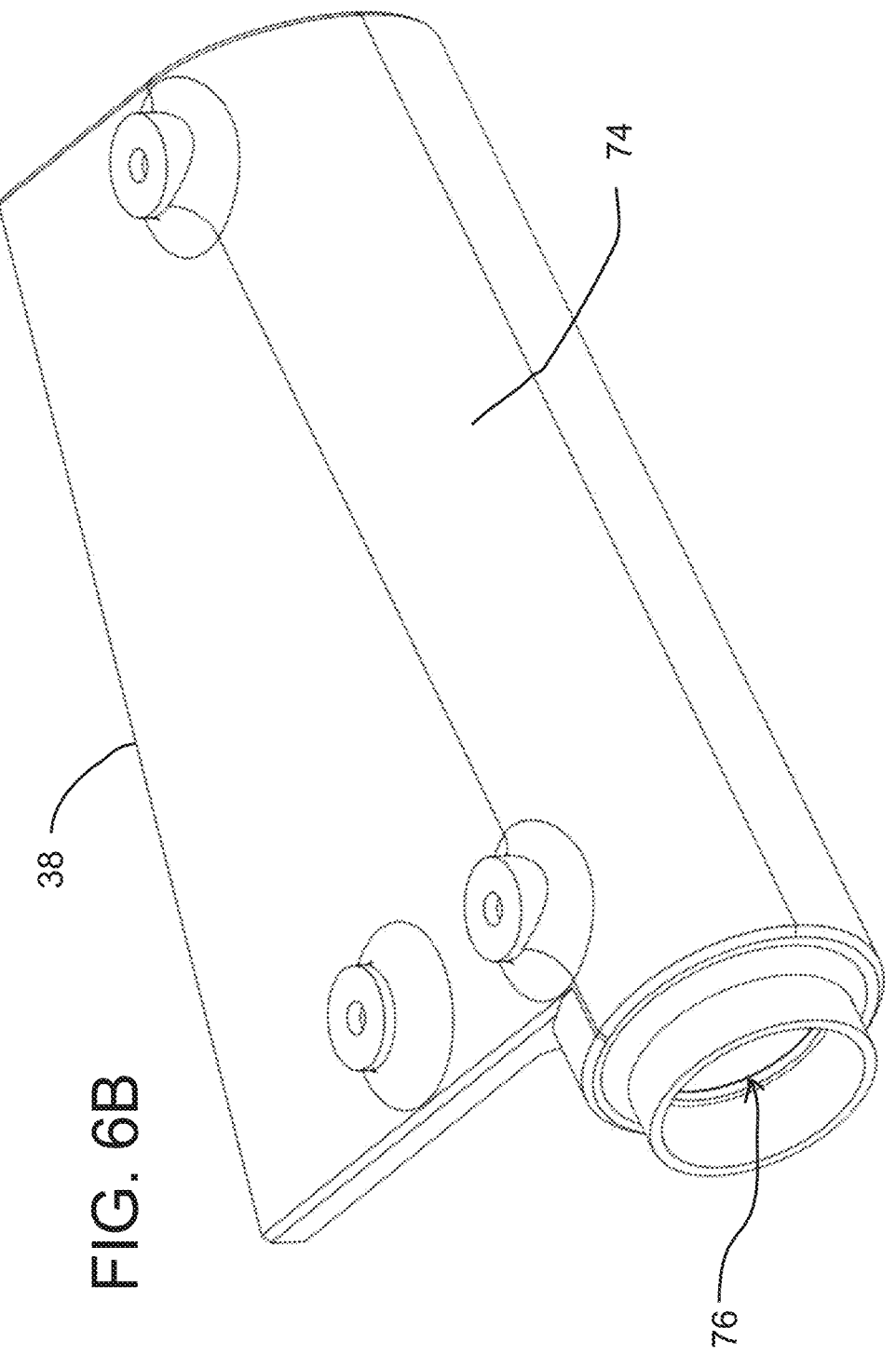
FIG. 6B is a top, right, rear diagrammatic perspective view of the second design of the high velocity plume/debris extraction segments according to the disclosure.
Figure 6C:
FIG. 6C is a top, right, front diagrammatic perspective view of a slightly modified second design of the high velocity plume/debris extraction segments according to the disclosure.
Figure 6D:
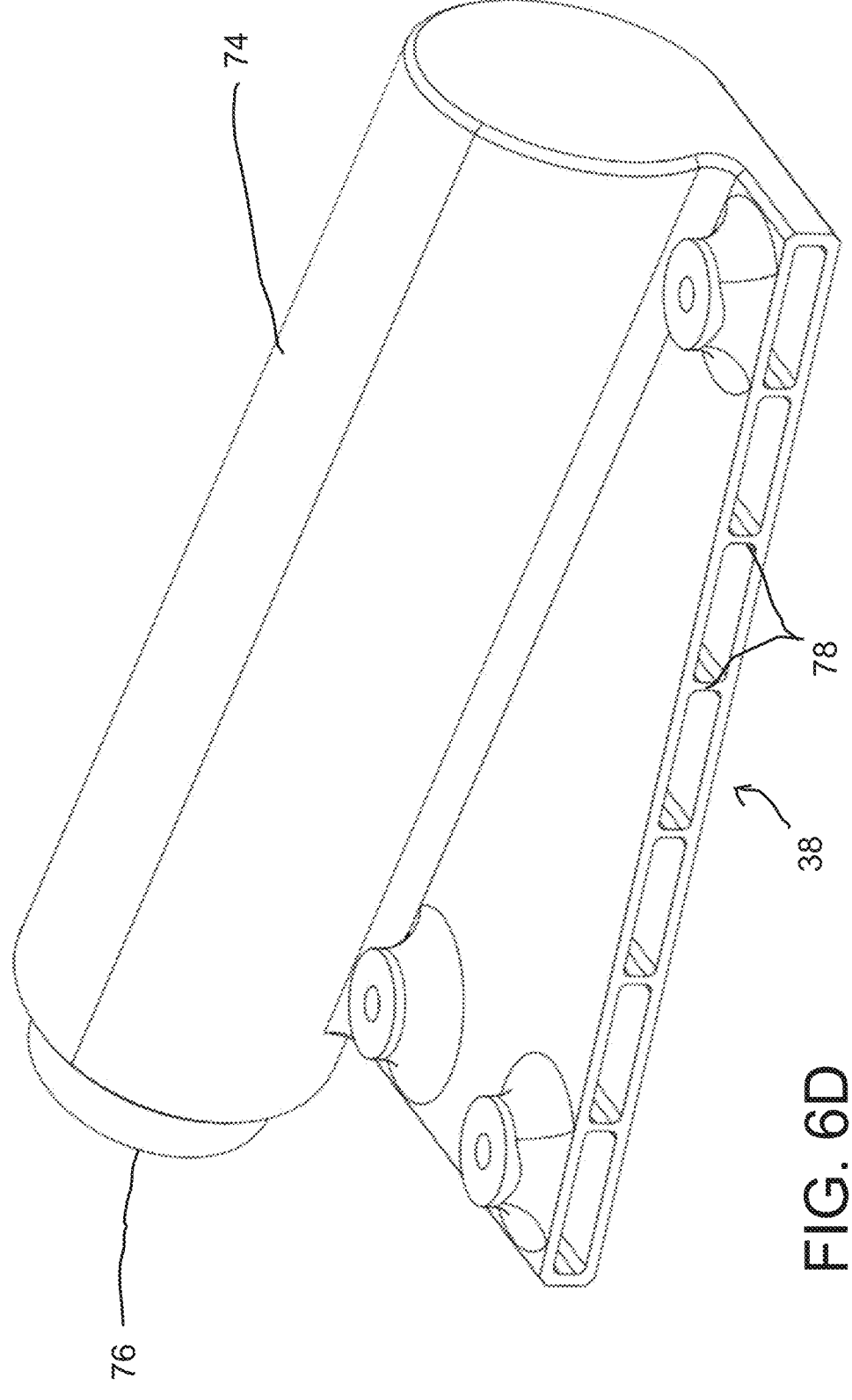
FIG. 6D is a top, right, rear diagrammatic perspective view of the second design of the high velocity plume/debris extraction segments according to the disclosure.

With reference now to FIGS. 5A and 5B, a detailed discussion concerning a first design of the high velocity plume/debris extraction segments 12 will now be provided. As shown in FIG. 7C for example, the first design of high velocity vacuum segment 12 are relatively compact and located along opposed longitudinal edges of the table framework 8. The first design of the high velocity plume/debris extraction segments 12 comprises a generally C-shaped exterior housing 30 which includes both an inlet nozzle 38 and a cyclonic chamber 74. The cyclonic chamber 74 has a centrally located discharge outlet 76, formed at one end thereof, for discharging the exhaust steam which is sucked in through the inlet nozzle 38 of the high velocity vacuum segment 12. As shown, the inlet nozzle 38 is divided, by a plurality (e.g., six) of walls 78, into seven separate inlet channels. It is to be appreciated that the number of separate inlet channels can vary from application to application. The walls 78 extend parallel to one another and are designed to induce laminar flow of the exhaust stream into and through each one of the separate inlet channel of the inlet nozzle 38. That is, each of the seven separate inlet channels have a constant transverse cross-sectional area along the entire length thereof. In addition, the generally C-shaped exterior housing 30 facilitates installation of the high velocity plume/debris extraction segments 12 in tight spaces while still permitting the exhaust stream to be efficiently exhausted.

Each one of the inlet channels is arranged so as to discharge the laminar flow exhaust stream tangentially into the cyclonic chamber 74. The laminar flow exhaust stream enters the cyclonic chamber 74 tangentially and then eventually flows radially inward and toward the centrally located discharge outlet 76 of the cyclonic chamber 74 before finally exiting from the high velocity plume/debris extraction segment 12.

With reference now to FIGS. 6A-6D, a detailed discussion concerning a second design of the high velocity plume/debris extraction segments 14 will now be provided. As shown in those figures, the second design of high velocity vacuum segments 14 are also located along the other two opposed longitudinal edges of the table framework 8. The second design of the high velocity plume/debris extraction segments 14 comprise an exterior housing which includes both a tapered inlet nozzle 38 as well as a cyclonic chamber 74. As shown, the inlet nozzle 38 is divided, by a plurality (e.g., six) of walls 78, into seven separate inlet channels. It is to be appreciated that the number of separate inlet channels can vary from application to application. The walls 78 extend parallel to one another and are designed to induce laminar flow of the exhaust stream into and through each one of the separate inlet channels of the inlet nozzle 38. That is, each of the seven separate inlet channels have a constant transverse cross-sectional area along the entire length thereof. In addition, the tapered inlet nozzle 38 facilitates installation of the high velocity plume/debris extraction segments 12 side by side, adjacent one another (see Fif. 7) while still permitting the exhaust stream to be efficiently exhausted.

Each one of the inlet channels is arranged so as to discharge the laminar flow exhaust stream tangentially into the cyclonic chamber 74. The laminar flow exhaust stream enters the cyclonic chamber 74 tangentially and then eventually flows radially inward and toward the centrally located discharge outlet 76 of the cyclonic chamber 74 before finally exiting from the high velocity plume/debris extraction segment 14.

Figure 10A:
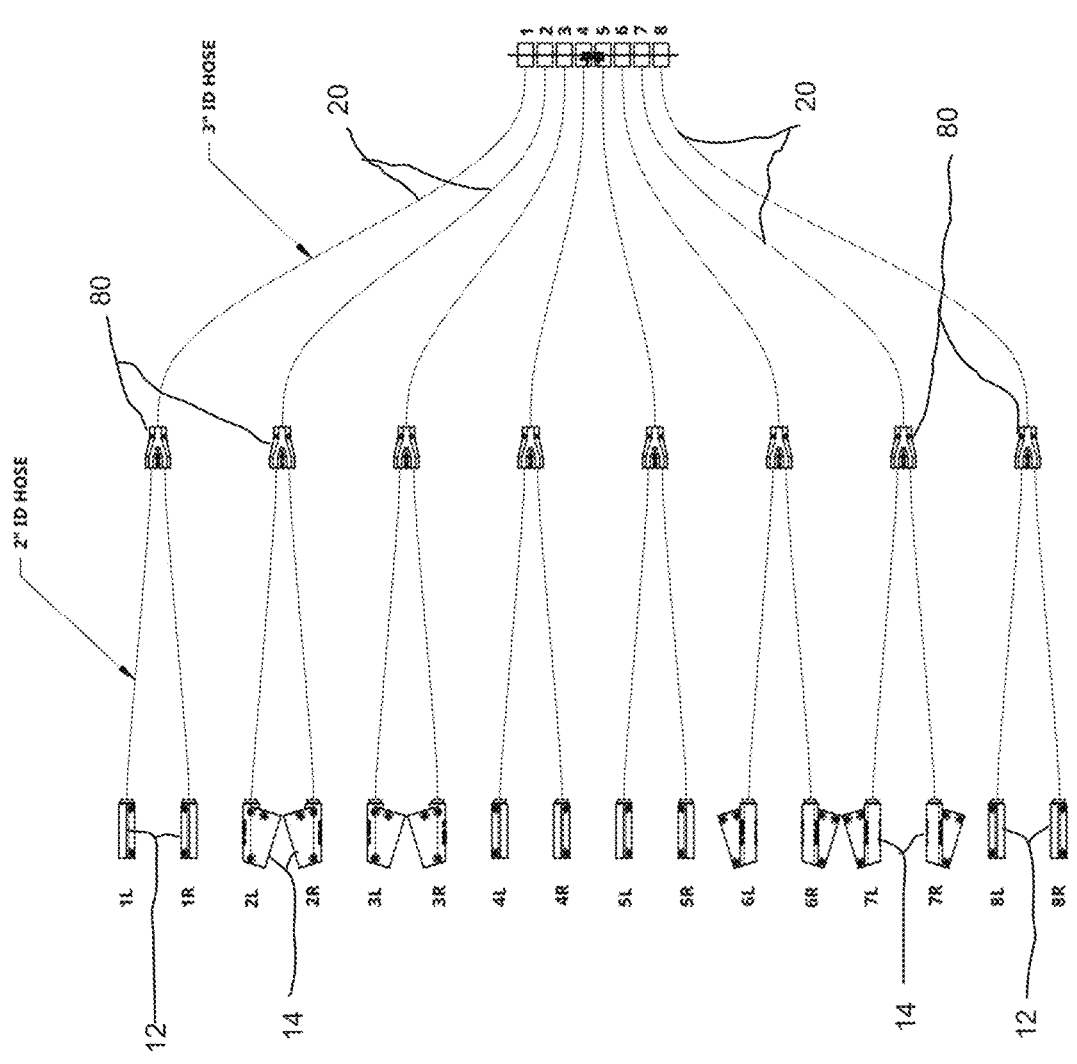
FIG. 10A is a diagrammatic view showing connection of the segment hoses to the Y connectors as well as connection of the larger diameter hoses to the snub section.
Figure 10B:
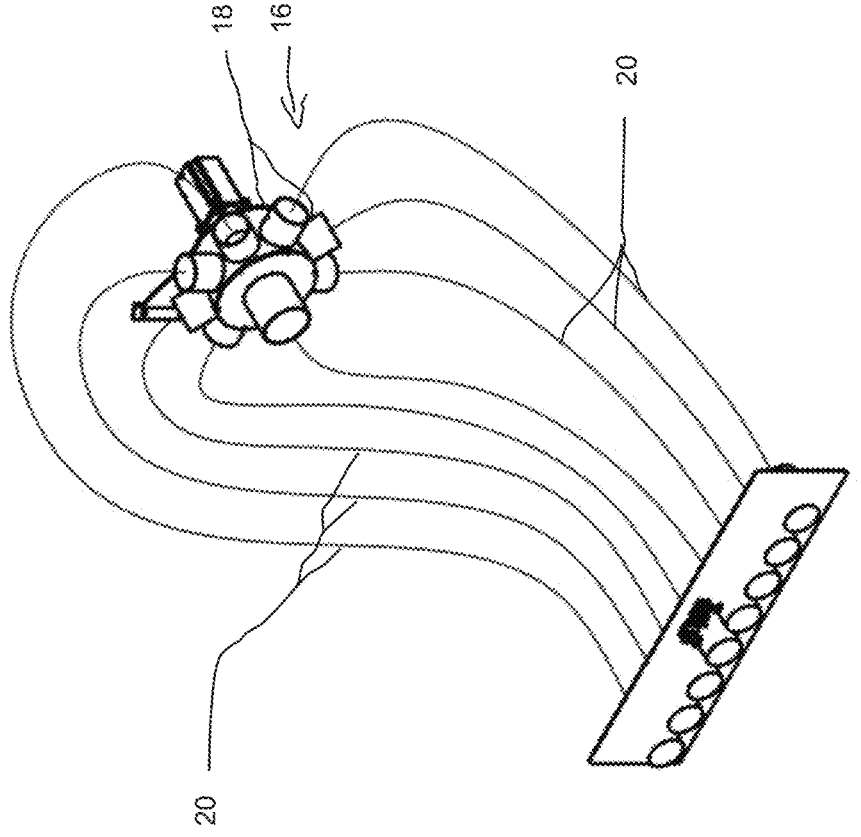
FIG. 10B is a diagrammatic view showing connection of the the larger diameter hoses of the snub section to the plurality of inlet ports of the rotatable turret assembly.

As shown in FIGS. 10A and 10B, a first end of a segment hose, e.g., a 2 inch diameter ID hose, is sealingly connected to the discharge outlet 76 of the cyclonic chamber 74 of each one of the first and the second designs of the high velocity plume/debris extraction segments 12, 14 while the second opposed and of the segment hose is sealingly connected to a respective first leg of a Y connector 80, as diagrammatically shown in FIG. 10A. In addition, a first end of a segment hose of a mating first and the second designs of the high velocity plume/debris extraction segments 12, 14 is sealingly connected to the discharge outlet 76 of the cyclonic chamber 74 while the second opposed end of that segment hose is sealingly connected to a second leg of the Y connector 80. A first end of a larger diameter combined hose, e.g., a 3 inch diameter ID hose, is connected to a third leg of the Y connector 80 while a second opposed end of the larger diameter combined hose is connected to a transition port of a stub section. To complete the interconnection, a first end of another larger diameter combined hose, e.g., a 3 inch diameter ID hose, is connected to an opposite side of each respective transition port while a second opposed end of the larger diameter combined hose is connected to a respective one of the eight inlet ports 18 of the turret housing 62. As a result of this arrangement, each adjacent pairs of the first and the second designs of the high velocity plume/debris extraction segments 12, 14 is connected to the rotatable turret assembly 16 for receiving negative pressure.

The cyclonic chambers 74 are designed to create vortex flow, where separation of heavy particles effected by gravity fall to the bottom of the chamber, while light gases transition cyclonically toward the vortex center where their velocity direction changes as they are transitioned into an exhaust duct or additional downstream filtration. This design harnesses the vortex flow inherent within a cyclonic chamber 74 to more quickly transition the change in the particle flow direction without lofting through any shape changes. The cyclonic vortex developed (independent of gravity) within the chamber, utilizes the flow direction change without impinging on, or interfering with the laminar development zone of the nozzle's intake. Lofting is replaced with the vortex. Laminar streamlines fold into the vortex and simultaneously changing direction as they transition into the circular vacuum duct using the vortex flow. This method has been found to reduce the required transition/lofting length by 75%. It should be noted that an optimum High Speed Cyclonic Laser Evacuation Nozzle has a ratio of the cross-sectional area of the flow nozzles to the cross-sectional area of the output of the cyclone chamber, that is about 1:1 to about 1.2:1. In many cases the optimum ratio of the internal diameter of the cyclonic chamber 74 to the height of the nozzle 38 is 8.75:1 to 9.12:1. The optimum ratio of the output port diameter where the vacuum pulls to the internal diameter of the vacuum chamber is 1:1.75 to 1:1.85.

The inlet section of each one of the high velocity plume/debris extraction segments 12, 14 as a plurality of dividers which partition the inlet section into between four and ten, typically about seven equal sections. These partitions extend from the inlet section to the turret session and are designed to assist with generating laminar flow into the inlet section of the high velocity plume/debris extraction segments 12, 14 so as to minimize turbulence. In addition, the dividers or walls 78 also assist with transferring the drawing in flow into the turret section while minimizing turbulence during such transfer. The drawn in flow then flows radially toward the center and outstripping the exhaust outlet of the turret section into the respective hose.

As diagrammatic showing in the figures, there are a total of 16 high velocity plume/debris extraction segments 12, 14, a first eight high velocity plume/debris extraction segments 12, 14 are associated with and arranged around the perimeter of the first table 10 while the second eight high velocity plume/debris extraction segments 12, 14 associated with and arranged around the perimeter of the second table 10. As described above, adjacent pairs of the high velocity plume/debris extraction segments 12, 14, located along a linear section of either the first or the second table 10, are simultaneously provided with vacuum to facilitate removing the generated plume and debris PD. It is to be appreciated that, depending upon the particular application, either more or less high velocity plume/debris extraction segments 12, 14 can be simultaneously subjected to vacuum, without departing from the spirit and scope of the present disclosure.

The high velocity plume/debris extraction segments 12, 14 each incorporate a vortex generating plenum below or adjacent to the input of the vacuum nozzle 38 pointed at the laser process as it is removing material. Each segment 12, 14 in this array is individually provided open a high velocity vacuum optimized between 200 and 800 cubic feet per minute. Each nozzle 38 is segmented together to form a continuous vacuum suction field along the laser processing route to entrain and extract the laser process gases and debris developed during highly energetic ablation and CW high power processes, such as laser bulk removal of material, trimming, cutting, drilling and selective material removal laser processes. This system may be utilized within many industries and the same design principles used to create the Segmented Vortex Based Plenum Vacuum Nozzles apply.

Evacuating or extracting laser induced ablation or thermal formation of particles or smoke across a microelectronic IC package manufacturing board, flexible circuit or traditional printed circuit boards requires creating a long-reaching laminar flow regime, orthogonal to the board surface. By creating a high velocity cross flow, laser produced particles, smoke, gas, etc., immediately become entrained within the exhaust stream as soon as they are ejected off the surface. Laser ablation causes expulsion of the removed material, as the removed material rises into the laminar cross-flow, the particle path bends to entrain into the laminar flow exhaust stream crossing the surface of the board. Once entrained, the ablation particles are evacuated and subsequently filtered by the dust collector separator system. In order for a nozzle 38 to create a long laminar flow regime over the surface of the targeted laser area, an adequate laminar flow development zone is required. After the development zone, a transition is required to smoothly discharge the flowing streamlines simultaneously as the shape of the nozzle transitions into the vacuum duct. To minimize laminar streamline perturbations, a long path-length is required to gently transition the cross-sectional shape from end to end.

This invention is a method for rolling up a long development zone tangentially onto itself as it transitions cyclonically into a circular vacuum duct. To transition effectively into a circular duct, without inducing any significant turbulent inefficiencies, a cyclonic chamber 74 is provided to induce the transition. This formation of a long laminar flow regime nozzle based on transition to a cross sectional plenum that cover the entire width of the nozzles laminar zone for optimized removal of debris and gases generated during laser ablation and other laser processes that generate and require debris removal.

Cyclonic chambers 74 are typically used to create vortex flow, where separation of heavy particles effected by gravity fall to the bottom of the chamber, while light gases transition cyclonically toward the vortex center where their velocity direction changes as they transition into an exhaust duct or additional downstream filtration. This design harnesses the vortex flow, inherent within a cyclonic chamber 74, to rapidly transition the change in the particle flow direction without lofting through any shape changes. The cyclonic vortex developed (independent of gravity) within the chamber, utilizes the flow direction change without impinging on, or interfering with the laminar development zone of the nozzle 38. Lofting is replaced with the vortex. Laminar streamlines fold into the vortex and simultaneously changing direction as they transition into the circular vacuum duct using the vortex flow. This arrangement is found to reduce the required transition/lofting length by 75%. It should be noted that an optimum High Speed Cyclonic Laser Evacuation Nozzle has a ratio of the cross-sectional area of the flow nozzles to the cross-sectional area of the output of the cyclone chamber, that is approximately 1:1 to approximately 1.2:1. In many cases the optimum ratio of the internal diameter of the cyclonic chamber 74 to the height of the nozzle 38 is at 8.75:1 to 9.12:1. The optimum ratio of the output port diameter, where the vacuum pulls, to the internal diameter of the vacuum chamber is at a ratio of 1:1.75 to 1:1.85.

It is to be noted that such evacuation nozzle 38 take up far less space while maintaining long laminar flow regimes across large printed circuit boards or IC package substrates. This is accomplished by rolling and folding the Laminar Flow Development Zone into the direction change imparted by the cyclonic chamber 74. This feature maintains large area laminarity, higher velocities than the traditional lofted approach, in a compact volume easy to package into tight manufacturing quarters.

The core of the nozzle technology is the simultaneous synchronization of a series of these nozzles that form a perimeter of the product being processed and each nozzles laminar suction is linked through motion control via a rotary vacuum turret to interpolate laser pulsing to motion and optimized vacuum extraction to a synchronized and optimum point where the process is the most efficient, is optimized for the safety of the operators' health, and to eliminate toxic gases, debris and other effluent created during the process.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, we claim:

1. A laser processing system comprising:
a laser beam generation source for generating laser pulses;
at least one table for supporting a desired surface to be processed;
an optical laser engine assembly for receiving and redirecting the generated laser pulses, from the laser beam generation source, toward the desired surface to be processed on the at least one table;
a plurality of high velocity plume/debris extraction segments being supported by a table framework adjacent the desired surface to be processed for removing a plume and generated debris during treatment of the desired surface to be processed;
a rotatable turret assembly having a plurality of inlet ports, and each one of the plurality of inlet ports is respectively connected with at least one of the plurality of high velocity plume/debris extraction segments by a respective segment hose;
a dust collector separator and a blower being coupled to the rotatable turret assembly for generating a desired negative pressure and subjecting the rotatable turret assembly to the negative pressure;

each of the plurality of high velocity plume/debris extraction segments being connected to one of the plurality of inlet ports of the rotatable turret assembly; and
the rotatable turret assembly having a turret which is rotatable, by a motor, to selectively subject a desired one or desired pair of the plurality of high velocity plume/debris extraction segments to the negative pressure, during processing by the generated laser pulses, to remove the plume and generated debris during treatment of the desired surface to be processed.

2. The laser processing system according to claim 1, wherein the plurality of high velocity plume/debris extraction segments are arranged side-by-side and adjacent one another generally around the entire perimeter of the desired surface to be processed.

3. The laser processing system according to claim 1, wherein each one of the high velocity plume/debris extraction segments generates substantially laminar flow into an associated inlet nozzle at a velocity of between 100 and 1500 cubic feet per minute to assist with removing debris as well as preventing re-solidification of such removed debris back onto the desired surface to be processed.

4. The laser processing system according to claim 1, wherein each one of the high velocity plume/debris extraction segments generates substantially laminar flow into an associated inlet nozzle at a velocity of between 200 and 800 cubic feet per minute to assist with removing debris as well as preventing re-solidification of such removed debris back onto the desired surface to be processed.

5. The laser processing system according to claim 1, wherein each one of the high velocity plume/debris extraction segments has an inlet nozzle which lies in a common plane that extends parallel to, but is slightly offset and located slightly vertically above, a top surface of the desired surface to be processed.

6. The laser processing system according to claim 1, wherein a bottom surface of a housing of the optical laser engine assembly supports a laser triangulation device for detecting, via triangulation, any variation in a relative distance between the optical laser engine assembly and a top surface of the desired surface to be processed for adjusting the relative positions between the optical laser engine assembly and the top surface of the desired surface to be processed, during operation.

7. The laser processing system according to claim 1, wherein a bottom surface of a housing of the optical laser engine assembly supports a pressure air knife which is located adjacent a laser beam outlet aperture, and a longitudinal axis of the air knife forms an angled of between 4 and 20 degrees with the bottom surface of the housing of the optical laser engine assembly and provides an air curtain which prevents of the plume and generated debris from entering, via a laser beam outlet aperture, into an internal compartment of the optical laser engine assembly.

8. The laser processing system according to claim 1, wherein the dust collector separator is divided, by an internal filter, into a lower chamber and an upper chamber, and larger particles migrate toward a bottom of the lower chamber while the filter separates and removes any finer particulate matter, from an exhaust stream, and prevent the finer particulate matter from flowing through the filter and into the upper chamber; and a separator exhaust outlet is provided in the upper chamber of the dust collector separator and the separator exhaust outlet is connected, by a blower hose, to a blower inlet of the blower while a blower discharge outlet of the blower communicates with and exhausts the exhaust stream directly into the surrounding environment.

9. The laser processing system according to claim 1, wherein each one of the plurality of high velocity vacuum segments comprises an exterior housing which houses both an inlet nozzle and a cyclonic chamber, the cyclonic chamber has a discharge outlet formed at one end thereof, for discharging an exhaust steam which is sucked in through the inlet nozzle of the high velocity vacuum segment, the inlet nozzle is divided, by a plurality of walls, into separate inlet channels, and each inlet channel has a constant transverse cross-sectional area.

10. The laser processing system according to claim 1, wherein the plurality of high velocity vacuum segments comprises first and second designs, and the first design of the plurality of high velocity vacuum segments are arranged along two opposed sides of the at least one table while the second of the plurality of high velocity vacuum segments are arranged along two other opposed sides of the at least one table.

11. The laser processing system according to claim 8, wherein the filter is a bed of activated charcoal which is suitable for removing any toxic and/or undesired gases and compounds from the exhaust stream before the exhaust stream is conveyed to the blower for discharge into the surrounding environment.

12. The laser processing system according to claim 1, wherein each one of the high velocity plume/debris extraction segments is mounted between a surface of a table framework supporting the at least one table and the surface to be processed so as facilitate drawing or sucking in plume and generated debris into an inlet nozzle of the activated one or pair of discrete high velocity plume/debris extraction segments.

13. The laser processing system according to claim 1, wherein the rotatable turret assembly comprises a turret which is rotatably accommodated within a turret housing, the turret housing supports the plurality of inlet ports as well as a centrally located outlet port; the turret has a single radial passage therein which communicates with an axial outlet passage, and the turret is connected to a motor which facilitates rotation of the turret to selectively control which one of the plurality of inlet ports and, in turn, which one or pair of the high velocity plume/debris extraction segment(s) will be subjected to negative pressure, and the motor is electrically connected to and controlled by the laser system controller to rotate the turret and align the single radial passage with a desired one of the plurality of inlet ports.

14. The laser processing system according to claim 1, wherein a combustion prevention/cooling knife is located between each one of plurality of high velocity plume/debris extraction segments and the desired surface to be processed, each one of these combustion prevention/cooling knives is arranged, side-by-side and adjacent one another, generally around the entire perimeter of the desired surface to be processed, each combustion prevention/cooling knife has an outlet opening, formed in an end face thereof, which is angled toward a top surface of the desired surface to be processed for cooling the desired surface to be processed and minimizing further combustion of the desired surface to be processed.

15. The laser processing system according to claim 14, wherein each of the combustion prevention/cooling knives is supplied with an inert gas, from a source of an inert gas, and the inert gas assists with rapidly extinguishing combustion of the desired surface, being ablated by the laser beam pulses, and cooling of an underlying oxide copper layer to assist with avoiding delimination/separation of the oxide copper layer from a central core layer.

16. The laser processing system according to claim 1, wherein the at least one table comprises first and second adjacent slidable tables which are each designed to support a desired substrate for laser ablation by the laser processing system, and when a desired substrate on one of the first and second tables is being ablated with the laser pulses, the other table may be removed, from a work area, and the desired substrate either flipped over or replaced with and a new desired substrate and then the other table can be returned to the work area for laser ablation by the laser processing system.

17. The laser processing system according to claim 1, wherein the optical laser engine assembly includes a gyro system for receiving the supplied laser beam pulses from the laser beam generation source and redirecting the laser beam pulses out through a laser beam output aperture toward a desired surface to be processed.

18. The laser processing system according to claim 1, wherein each one of the plurality of high velocity plume/debris extraction segments is designed to draw or suck in the plume and the associated debris, generated by laser beam pulses during processing, so as to remove the plume and debris same from the desired surface being processed and thereby avoid hindering the desired processing of the desired surface by the laser beam pulses.

19. The laser processing system according to claim 1, wherein a ratio of a cross-sectional area of the flow nozzles to a cross-sectional area of an outlet of a cyclone chamber is 1:1 to 1.2:1, and a ratio of an internal diameter of the cyclonic chamber to a height of an inlet nozzle 8.75:1 to 9.12:1.

* * * * *